United States Patent
Numaguchi et al.

(10) Patent No.: US 10,510,189 B2
(45) Date of Patent: Dec. 17, 2019

(54) INFORMATION PROCESSING APPARATUS, INFORMATION PROCESSING SYSTEM, AND INFORMATION PROCESSING METHOD

(71) Applicant: SONY INTERACTIVE ENTERTAINMENT INC., Tokyo (JP)

(72) Inventors: Naoki Numaguchi, Tokyo (JP); Keiji Togawa, Tokyo (JP); Hiroshi Osawa, Kanagawa (JP); Takeshi Yamagishi, Kanagawa (JP); Shinichi Hirata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 430 days.

(21) Appl. No.: 15/302,344

(22) PCT Filed: Jan. 13, 2015

(86) PCT No.: PCT/JP2015/050682
§ 371 (c)(1),
(2) Date: Oct. 6, 2016

(87) PCT Pub. No.: WO2015/159561
PCT Pub. Date: Oct. 22, 2015

(65) Prior Publication Data
US 2017/0024934 A1 Jan. 26, 2017

(30) Foreign Application Priority Data
Apr. 16, 2014 (JP) .................................. 2014-084945

(51) Int. Cl.
*G06T 19/00* (2011.01)
*A63F 13/65* (2014.01)
(Continued)

(52) U.S. Cl.
CPC .......... *G06T 19/006* (2013.01); *A63F 13/213* (2014.09); *A63F 13/42* (2014.09);
(Continued)

(58) Field of Classification Search
CPC .... A63H 11/00; A63H 17/00; A63H 2200/00; G06T 19/006; A63F 13/213; A63F 13/42; A63F 13/52; A63F 13/55
(Continued)

(56) References Cited

U.S. PATENT DOCUMENTS 8,447,428 B2   5/2013  Maisonnier et al.
8,602,857 B2 * 12/2013  Morichau-Beauchant ..................
                                                      A63F 3/00214
                                                      273/236
(Continued)

FOREIGN PATENT DOCUMENTS

JP      11-312039 A    11/1999
JP    2005-317032 A    11/2005
(Continued)

OTHER PUBLICATIONS

Notification of Reasons for Refusal dated Sep. 5, 2017, from the corresponding Japanese Patent Application No. 2016-513652.
(Continued)

*Primary Examiner* — Michael A Cuff
(74) *Attorney, Agent, or Firm* — Katten Muchin Rosenman LLP

(57) ABSTRACT

In an information processing system 1, an information processing apparatus 10 recognizes, when a user moves real bodies 120a and 120b arranged on a play field 19, the movement on the basis of, for example, an image taken by a camera 122 taking an image of the movement to interlock objects of corresponding characters 202a and 202b displayed on a display apparatus 16. In addition, when the user moves the characters 202a and 202b through an input apparatus 14, the information processing apparatus 10 transmits a control signal to the corresponding real bodies 120a and 120b to perform interlocking. When a situation in which interlocking between the real bodies 120a and 120b and the characters 202a and 202b is difficult occurs, an appropriate scenario is selected from the scenarios prepared in advance and realized, thereby maintaining the consistency.

13 Claims, 12 Drawing Sheets

(51) Int. Cl.
*A63F 13/55* (2014.01)
*A63F 13/213* (2014.01)
*A63F 13/52* (2014.01)
*G06F 3/01* (2006.01)
*A63H 11/10* (2006.01)
*A63H 17/00* (2006.01)
*A63F 13/42* (2014.01)

(52) U.S. Cl.
CPC .............. *A63F 13/52* (2014.09); *A63F 13/55* (2014.09); *A63F 13/65* (2014.09); *A63H 11/10* (2013.01); *A63H 17/00* (2013.01); *G06F 3/011* (2013.01); *A63H 2200/00* (2013.01)

(58) Field of Classification Search
USPC .......................................................... 463/31
See application file for complete search history.

(56) References Cited

U.S. PATENT DOCUMENTS

| | | | | |
|---|---|---|---|---|
| 2005/0228540 | A1* | 10/2005 | Moridaira | A63H 11/00 700/245 |
| 2005/0245302 | A1 | 11/2005 | Bathiche et al. | |
| 2011/0216060 | A1* | 9/2011 | Weising | G09G 5/08 345/419 |
| 2011/0256927 | A1* | 10/2011 | Davis | A63F 9/0468 463/34 |
| 2012/0052934 | A1* | 3/2012 | Maharbiz | A63F 3/00214 463/9 |
| 2015/0160784 | A1* | 6/2015 | Wilson | G06K 9/00355 345/175 |

FOREIGN PATENT DOCUMENTS

| | | |
|---|---|---|
| JP | 2008-73256 A | 4/2008 |
| JP | 2010-531743 A | 9/2010 |
| JP | 2010-531746 A | 9/2010 |
| JP | 2013-149106 A | 8/2013 |
| WO | 2007/050885 A2 | 5/2007 |
| WO | 2008-149099 A1 | 12/2008 |
| WO | 2009/004004 A1 | 1/2009 |
| WO | 2012/023573 A1 | 2/2012 |

OTHER PUBLICATIONS

International Search Report and Written Opinion dated Mar. 17, 2015, from the corresponding PCT/JP2015/050682.

Michael Philetus Weller, Ellen Yi-Luen Do, Mark D Gross, "Posey: Instrumenting a Poseable Hub and Strut Construction Toy", Proceedings of the Second International Conference on Tangible and Embedded Interaction, Feb. 18-20, 2008, pp. 39-46, Bonn, Germany.

\* cited by examiner

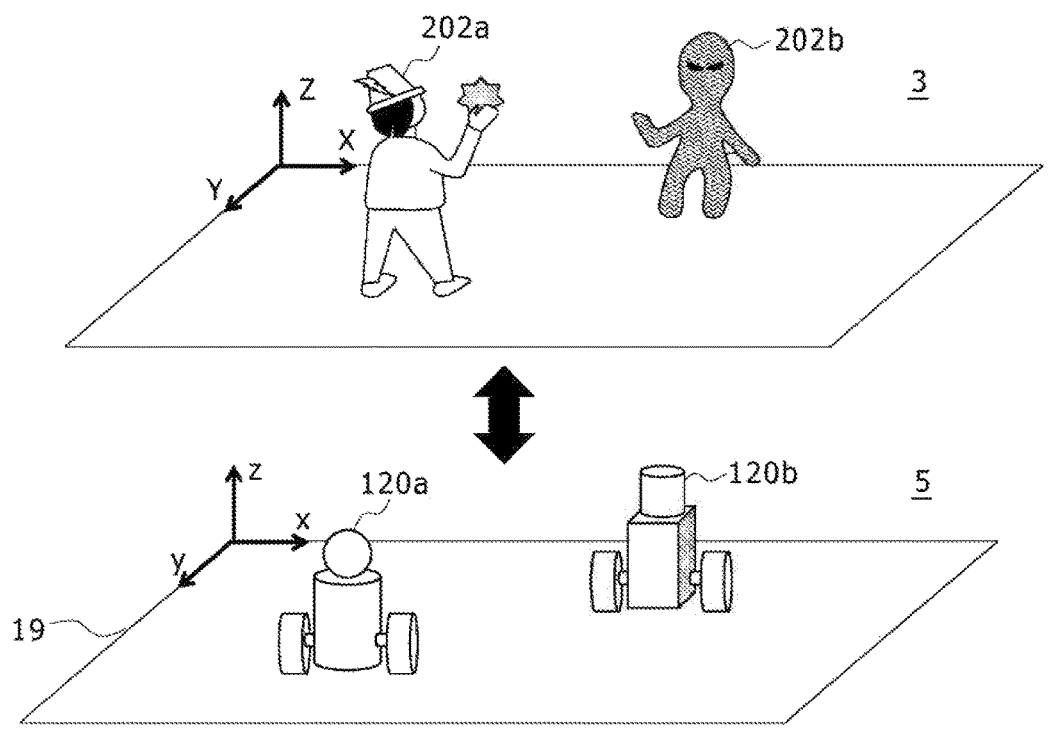

INFORMATION PROCESSING APPARATUS, INFORMATION PROCESSING SYSTEM, AND INFORMATION PROCESSING METHOD

TECHNICAL FIELD

The present invention relates to an information processing technology based on a body in a real space.

BACKGROUND ART

Recently, technologies in which parameters related with such bodies in a real space as humans and things are measured by some means and the results thereof are captured as an input value in a computer for analysis and displayed as images are used in a variety of fields. In the field of computer games, intuitive and easy operations have been realized by acquiring the movements of a user himself or herself and the marker held by the user and accordingly moving characters in a virtual world inside a display screen (refer to PTL 1 for example). The technologies for reflecting the movement and shape change of a body in a real space onto a display image are expected for the application not only to games but also to toys and learning tools (refer to NPL 1 and PTL 2 for example).

CITATION LIST

Patent Literatures

[PTL 1]
WO 2007/050885 A2
[PTL 2]
JP 2008-73256 A

Non Patent Literature

[NPL 1]
Posey: Instrumenting a Poseable Hub and Strut Construction Toy, Michael Philetus Weller, Ellen Yi-Luen Do, Mark D Gross, Proceedings of the Second International Conference on Tangible and Embedded Interaction, 2008, pp. 39-46

SUMMARY

Technical Problems

The above-mentioned conventional technologies are basically presumes comparatively simple image display such as displaying a body in a real space with the shape thereof unchanged and displaying an image obtained by replacing a part of a body by an object drawn by computer graphics. However, as the performance of processing bodies themselves and the technologies of recognizing bodies in an information processing apparatus advance in the future, there would occur a big problem how to express the further fusion and cooperativeness with a real space by use of obtained information. In addition, in the case of similar processing systems, it is desirable to realize modes matching the needs as occasion may demand.

Therefore, the present invention has been done with respect to the problems mentioned above for the purpose of solving these problems by providing a new technology for cooperatively operating the movement of a body in a real space and an image display.

Solution to Problems

A mode of the present invention relates to an information processing apparatus. This information processing apparatus has an information processing block configured to execute an information processing in accordance with at least one of a user operation for moving a real body existing in a real world and a user operation through a connected input apparatus; and a display processing block configured to draw a virtual space in which a virtual object exists as a result of the information processing to display the drawn virtual space onto a display apparatus. The information processing block interlocks the real body with the virtual object by executing at least one of a real body control processing for generating a control signal for interlocking the real body and transmitting the generated control signal to the real body concerned when the virtual object is moved by the user operation through the input apparatus and an operation processing on the virtual space for interlocking the virtual object when the user operation for moving the real body is executed and, when a situation associated with a preset situation in which interlocking is difficult is detected, executes a corresponding processing selected according to the situation concerned, thereby continuing a subsequent information processing.

Another mode of the present invention also relates to an information processing apparatus. This information processing apparatus has an information processing block configured to execute an information processing in accordance with a user operation for moving a real body existing in a real world; and a display processing block configured to draw a virtual space in which a virtual object exists as a result of the information processing to display the drawn virtual space on a display apparatus. When the user operation for moving the real body is executed, the information processing block interlocks the real body and the virtual object with each other by executing an operation processing on the virtual space for interlocking the virtual object and determines a prohibited area in which the real body cannot be placed in the real world in consideration of a situation of a virtual world. The display processing block further generates an image representative in a graphic a position of the prohibited area concerned in a plane on which the real body is placed in the real world, and projects the generated image onto the plane trough a projector or displays the generated image on a screen of a tablet computer making up the plane.

Still another mode of the present invention also relates to an information processing apparatus. This information processing apparatus has an information processing block configured to execute an information processing in accordance with a user operation for moving a real body existing in a real world and a user operation through a connected input apparatus; and a display processing block configured to draw a virtual space in which at least a virtual object exists as a result of the information processing to display the drawn virtual space onto display apparatus. When the user operation for moving the real body is executed, the information processing block executes an operation processing on the virtual space for interlocking the virtual object with the real body and, when the user operation through the input apparatus is executed, executes an information processing different from the operation processing on the virtual space. The display processing block displays an image generated as a result of the operation processing on the virtual space and an image generated as a result of the information processing different from the information processing onto the display apparatus in a switched manner in accordance with operating means used by a user.

Yet another mode of the present invention relates to an information processing system. This information processing system has an information processing apparatus; and a real body that can be moved in at least one of manners; by a user and by a control signal from the information processing apparatus. The information processing apparatus includes an information processing block configured to execute an information processing in accordance with at least one of a user operation for moving the real body and a user operation through a connected input apparatus, and a display processing block configured to draw a virtual space in which a virtual object exists as a result of the information processing to display the drawn virtual space onto a display apparatus. The information processing block interlocks the real body with the virtual object by executing at least one of a real body control processing for generating a control signal for interlocking the real body and transmitting the generated control signal to the real body concerned when the virtual object is moved by the user operation through the input apparatus and an operation processing on the virtual space for interlocking the virtual object when the user operation for moving the real body is executed and, when a situation associated with a preset situation in which interlocking is difficult is detected, executes a corresponding processing selected according to the situation concerned, thereby continuing a subsequent information processing.

A further mode of the present invention relates to an information processing method. This information processing method by an information processing apparatus has a step of executing an information processing in accordance with at least one of a user operation for moving a real body existing in a real world and a user operation through a connected input apparatus; and a step of drawing a virtual space in which a virtual object exists as a result of the information processing to display the drawn virtual space onto a display apparatus. The information processing step includes a step of interlocking the real body with the virtual object by executing at least one of a real body control processing for generating a control signal for interlocking the real body and transmitting the generated control signal to the real body concerned when the virtual object is moved by the user operation through the input apparatus and an operation processing on the virtual space for interlocking the virtual object when the user operation for moving the real body is executed, and a step of continuing a subsequent information processing by executing, when a situation associated with a preset situation in which interlocking is difficult is detected, a corresponding processing selected according to the situation concerned.

It should be noted that any combinations of above-mentioned components and the expressions of the present invention as converted between the methods, apparatuses, systems, computer programs, and recording media are also valid as the modes of the present invention.

Advantageous Effect of Invention

According to the present invention, a variety of information processing technologies based on the use of bodies in a real world can be provided.

BRIEF DESCRIPTION OF DRAWINGS

FIG. 3 is a diagram illustrating an example of a technique of interlocking real bodies and objects inside a screen in the present embodiment.

FIG. 4 is a diagram illustrating an exemplary data structure of information related with real bodies to be stored in a real body information storage block in the present embodiment.

DESCRIPTION OF EMBODIMENT

Figure 1:
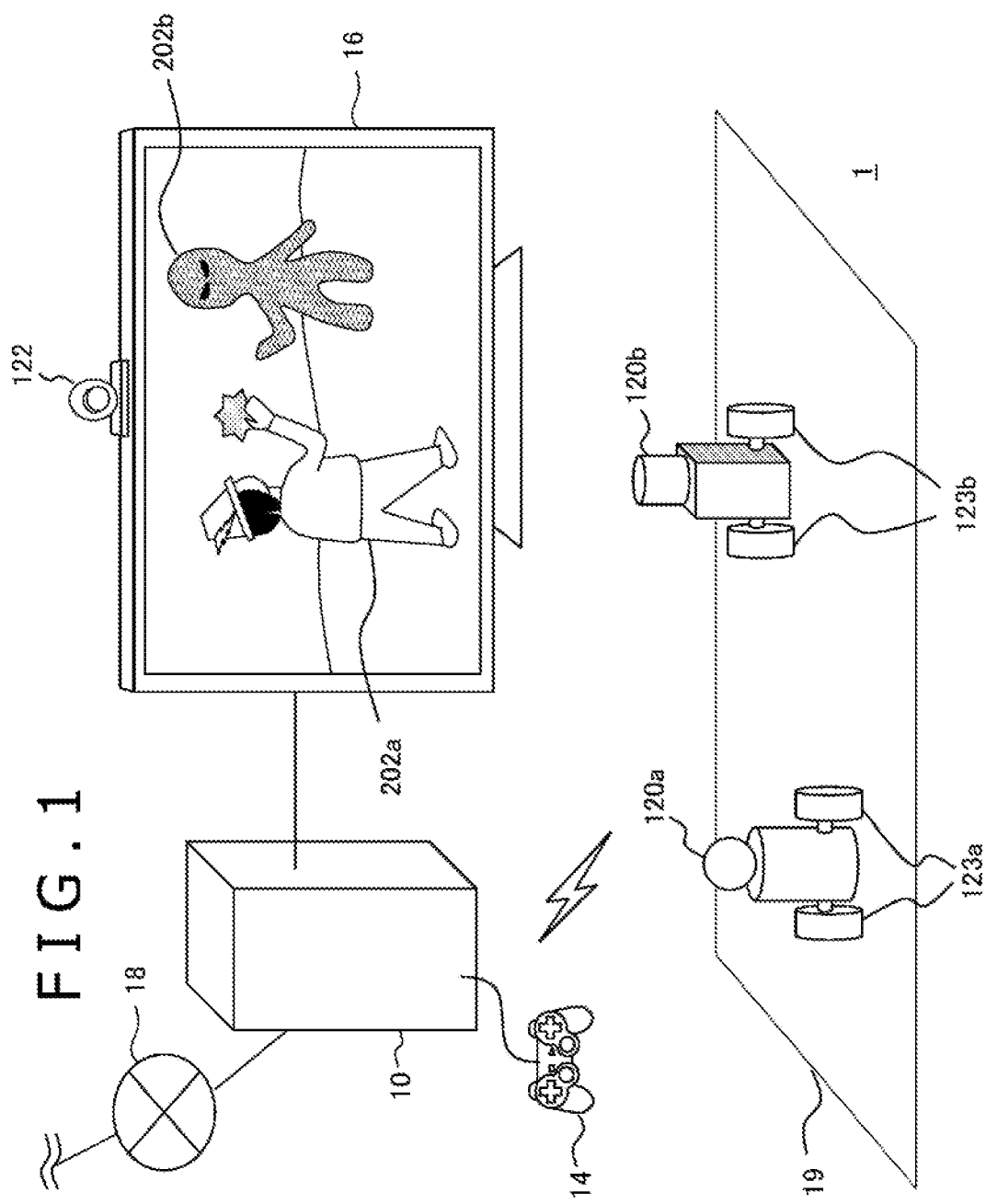
FIG. 1 is a diagram illustrating an exemplary configuration of an information processing system to which a present embodiment is applicable.

In the present embodiment, there are two cases: one where information processing is executed by capturing an action of moving by a user a thing existing in a real space (hereafter referred to as "a real body") as a user operation and one where a real body is moved by an information processing apparatus as a result of information processing. In any case, interlocking a real body with an object on a display screen makes a user operation and grasping of the information processing intuitive and easy. FIG. 1 shows an exemplary configuration of an information processing system to which the present embodiment is applicable. An information processing apparatus 1 has real bodies 120a and 120b arranged on a play field 19, a camera 122 for taking images of the real bodies 120a and 120b, an information processing apparatus 10 for executing predetermined information processing, an input apparatus 14 for accepting a user operation as a general operating means, and a display apparatus 16 for displaying data outputted from the information processing apparatus 10 as an image.

The information processing apparatus 10 may be a game apparatus or a personal computer for example and realize an information processing function by loading a necessary application program into the information processing apparatus 10. The information processing apparatus 10 may establish communication with another information processing apparatus and a server via a network 18 as required, thereby transmitting and receiving necessary information. The display apparatus 16 may be a general-purpose display such as a liquid crystal display, a plasma display, an organic EL (Electroluminescence) display or the like. Alternatively, the display apparatus 16 may be a television having one of these display and a speaker. Still alternatively, the display apparatus 16 may be a projector that projects images. At this time, a projection plane may be the play field 19 as will be described later. Yet alternatively, the display apparatus 16 may be a tablet PC (Personal Computer). By horizontally setting the tablet PC, the screen thereof may be used as the play field 19. The display apparatus 16 may be any combination of a general-purpose display, projector, and tablet PC. It should be noted that the display apparatus 16 may not be a television having a speaker but a television and a separately arranged audio reproduction apparatus (not shown) for outputting predetermined audio.

The camera 122 is a digital video camera having an imaging device such as a CCD (Charge Coupled Device) or a CMOS (Complementary Metal Oxide Semiconductor) for example and takes a moving image of a space that includes at least the play field 19 and the real bodies 120a and 120b thereon. The input apparatus 14 may be any one of general-purpose input apparatuses such as a game controller, a keyboard, a mouse, a joy stick, and a touch pad arranged on the screen of the display apparatus 16 or any combination thereof. The information processing apparatus 10 may be connected to the camera 122, the input apparatus 14, and the display apparatus 16 via a variety of networks whether wired or wireless. Alternatively, two or more or all of the camera 122, the information processing apparatus 10, the input apparatus 14, and the display apparatus 16 may be combined and mounted integrally. Still alternatively, the camera 122 may not always be mounted on the display apparatus 16.

The play field 19, when the real bodies 120a and 120b are arranged thereon, makes the information processing apparatus 10 recognize these as subjects of processing and provides a plane that specifies an area for defining the positional coordinates thereof; for example, the play field 19 may be any of a plate, a piece of cloth, a desk top plate, and a game board. The real bodies 120a and 120b may be bodies of simple shapes as shown or bodies having more complicated shapes like miniatures of bodies in a real world such as dolls and miniature cars or parts thereof or pieces of a game. It should be noted that the size, material, color, and number of units to be used of the real bodies 120a and 120b are not limited. Further, the real bodies 120a and 120b may have structures that are built by a user or may be finished products.

The real bodies 120a and 120b establish communication with the information processing apparatus 10 as required. The connection may be based on a wireless interface such as Bluetooth (registered trademark) or IEEE (Institute of Electrical and Electronic Engineers) 802.11 for example or through a cable. It should be noted however that the real bodies 120a and 120b may not have a communication function if enough information is obtainable from an image taken by the camera 122 or the information processing apparatus 10 need not operate the real bodies 120a and 120b, for example.

If the information processing apparatus 10 is required to operate the real bodies 120a and 120b, a mechanism that operates as instructed by control signals from the information processing apparatus 10 is arranged on the real bodies 120a and 120b in addition to the above-mentioned communication function. In the example shown in FIG. 1, the real bodies 120a and 120b are provided with wheels 123a and 123b, respectively, so as to move on demand from the information processing apparatus 10. However, operation types and mechanism are not limited to those mentioned above; joint angle change, vibration, light emission, or audio output is also practicable, including a combination of two or more types of operations. It is also practicable to introduce a mechanism other than wheels as moving means. It should be noted that, in what follows, the real bodies 120a and 120b and so on may be generically referred to as a real body 120.

In the present embodiment, the basic idea is that the real body 120 and an object inside a display screen which are related with each other in advance are interlocked to each other. In the example shown in FIG. 1, the real body 120a is related with a first character 202a inside a screen and the real body 120b is related with a second character 202b inside the screen. When the first character 202a inside the screen moves to the right side, the real body 120a also moves to the right side on the play field 190. Conversely, when the real body 120a moves forward, then the first character 202a inside the screen also moves forward. Which of the movements is to be reflected on the other is determined by a programmer or the like in accordance with the contents and function of information processing.

Figure 2:
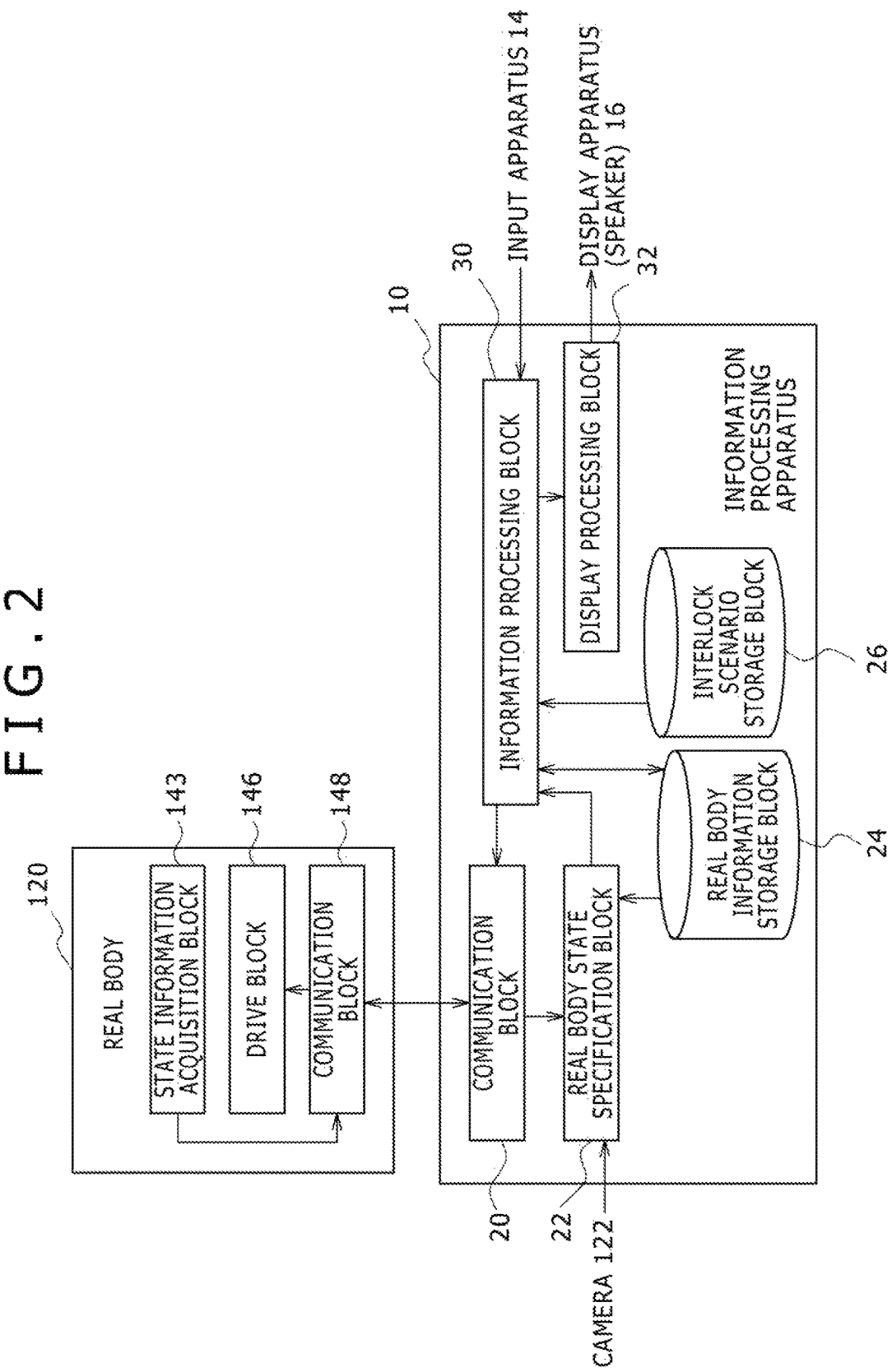
FIG. 2 is a diagram illustrating in detail configurations of a real body and an information processing apparatus in the present embodiment.

Referring to FIG. 2, there is shown in detail configurations of the real body 120 and the information processing apparatus 10. In FIG. 2, each component described as a functional block for executing various processing operations can be made up of a CPU (Central Processing Unit), a memory, a microprocessor, or another LSI (Large Scale Integration), an actuator, a sensor, and so on in a hardware approach; in a software approach, each component is realized by a program and the like loaded in the memory. Therefore, it will be understood by those skilled in the art that these functional blocks can be realized only by hardware, only by software, or by combinations of both in various forms and therefore are not limited to any one of the forms mentioned above.

The real body 120 has a state information acquisition block 143 for acquiring own state information that can be acquired inside a real body, a drive block 146 that operates as instructed by a control signal from the information processing apparatus 10, and a communication block 148 for transmitting and receiving necessary information to and from the information processing apparatus 10. It should be noted however that, as described above, these functional blocks need not be arranged inside the real body 120 if a position of the real body 120 is obtained only from an image taken by the camera 122 or in a mode where the information processing apparatus 10 need not operate the real body 120. In this case, the real body 120 may be a thing such as a planar card, a doll having no internal structure, a piece of game, or a block. Even in this case, providing exterior variations such as providing different colors, patterns, and shapes or printing two dimensional barcodes for example allows precision identification of the figure of a real body from a taken image.

The state information acquisition block 143 is a sensor for internally measuring a state of the real body 120 itself and appropriately selects a sensor for obtaining necessary information from the viewpoint of reflecting a form of the real body 120 and which of movements of the real body 120 onto an object inside a screen. For example, if it is desired to reflect the movement of the real body 120 involving wheel rotation onto the movement of a character inside the screen as shown in FIG. 1, a rotary encoder and a rudder angle sensor are arranged on the wheels so as to identify the movement amount and movement direction of the wheels. In addition, the state information acquisition block 143 may be a positional sensor for getting an absolute position of the real body 120 or a motion sensor such as an acceleration sensor, a gyro sensor, or geomagnetic sensor.

If a flexible joint is arranged on the real body 120 by the user and an angular change of the joint is reflected on the change in attitude of an object inside a screen, a potentiometer for identifying joint angles may be introduced. As described above, in the present embodiment, introduction of more various sensors leads to capturing of a fine movement and a shape change of the real body 120, thereby reflecting the captured information onto each object inside the screen. In what follows, description will be made by paying attention to a mode in which the movement of the real body 120 is interlocked with the movement of the object inside the screen. In this case, it is also practicable not to arrange the state information acquisition block 143 on the real body 120 but analyze an image taken by the camera 122, thereby sequentially identifying the positions of the real body 120. Therefore, in consideration of required positional detection accuracy and manufacturing cost, the necessity or unnecessity of the state information acquisition block 143 may be determined.

The drive block 146 includes an actuator for moving the real body 120 through a control signal from the information processing apparatus 10. As shown in FIG. 1, if the real body 120 is moved by rotation of the wheels, an axle is rotated and rudder angles are changed by this actuator. Consequently, the real body 120 is moved in the direction and distance according to the control signal from the information processing apparatus 10. In addition, the drive block 146 may have an actuator for generating motion other than the movement, a vibrator for vibrating the real body 120, a light emitting body such as a light bulb, image data and a display for displaying an image, and audio data and a speaker for outputting audio, for example. These mechanisms are also operated by a control signal from the information processing apparatus 10.

The communication block 148 gets state information of the real body 120 from the state information acquisition block 143 and sequentially transmits the obtained state information to an information processing block 30. Also, the communication block 148 receives a control signal transmitted from the information processing apparatus 10 for operating the real body 120 and notifies the drive block 146 of the received control signal. The communication block 148 holds the individual identification information of the own real body 120 into an internal memory. Next, at the time of information transmission to the information processing apparatus 10, this individual identification information is added to allow the information processing apparatus 10 to discriminate the transmission source of this information. In addition, the communication block 148 determines whether or not a control signal transmitted from the information processing apparatus 10 is addressed to the own real body 120 on the basis of the individual identification information transmitted along with the control signal.

The information processing apparatus 10 includes a communication block 20 for transmitting and receiving necessary information to and from the real body 120, a real body state specification block 22 for specifying a state of the real body 120 on the basis of an image taken by the camera 122 and the information transmitted from the real body 120, the information processing block 30 for executing predetermined information processing in accordance with a user operation on the real body 120 and an input apparatus 14, and a display processing block 32 for generating an image to be displayed as result of the information processing and outputting the generated image to the display apparatus 16. The information processing apparatus 10 further includes a real body information storage block 24 for storing information associated with each real body 120 and an interlock scenario storage block 26 for storing a scenario for realizing interlocking between a real body and an object inside a screen.

In a mode where state information is transmitted from the real body 120, the communication block 20 receives the state information concerned and supplies the received state information to the real body state specification block 22. In a mode where the real body 120 is operated by a control signal from the information processing apparatus 10, the communication block 20 gets a control signal for this purpose from the information processing block 30 and transmits the obtained control signal to the real body 120. The real body state specification block 22 gets image frames of a taken image from the camera 122 in realtime and analyzes the obtained image frames so as to specify a position of the real body 120 with predetermined time intervals.

For example, setting the camera 122 as a stereoscopic camera allows acquisition of an absolute position of a real body in a three-dimensional space made up of the depth direction relative to the camera 122 and the view field plane of the camera. A technique is widely known in which a position of a subject in a three-dimensional space is obtained by the principle of trigonometrical survey by use of a parallax in an image taken by a stereoscopic camera from left and right different viewpoints. Instead of a stereoscopic camera, means for obtaining depth and three-dimensional information other than binocular stereoscopic may be used. For example, a viewpoint movement camera may be used or, by use of an infrared ray radiation mechanism and an infrared ray sensor for detecting reflection light thereof, the position of a real body may be specified through a technique of TOF (Time Of Flight). Alternatively, instead of the camera 122, a touch panel may be arranged on top of the base on which the real body 120 is arranged so as to detect the position of the arrangement of the real body 120. In addition, by use of an existing visual tracking technique, the real body 120 may be tracked in a manner of temporal development.

Further, as described above, by use of the state information transmitted from the real body 120, a movement, a position, and an attitude may be specified in detail. If there are two or more real bodies 120, it is required to relate a figure in a taken image with the transmitted state information. For this purpose, information with the external view characteristics of the real body 120 related with the individual identification information is stored in the real body information storage block 24 in advance. The external view characteristics denote the color, shape, pattern, and size of the real body 120. As described above, a two-dimensional barcode may be used or a marker emitting light in a particular color may be installed. Then, by matching the individual identification information added to the information transmitted from the real body 120 with the individual identification information corresponding to the external view characteristics of a figure detected in a taken image, the figure in a taken image is related with the transmitted state information.

The information processing block 30 executes processing to be done in accordance with a movement of the real body 120 moved by a user or a user operation done through the input apparatus 14. In the description that follows, various types of games will be illustrated but these games do not limit the processing that is executed by the information processing block 30. In any case, the information processing block 30 executes the processing that involves the interlocking between the real body 120 and an object inside a screen. For this reason, the corresponding relation between the real body 120 and an object inside a screen that are interlocked with each other is also stored in the real body information storage block 24. Here, the object inside a screen is a character or the like that appears in a game to be executed by the information processing block 30, so that the model data for each object and a role in the game are separately set in advance like general computer games.

The interlock scenario storage block 26 stores a scenario necessary for interlocking the real body 120 with an object inside a screen. Here, a scenario specifies solution means that makes the real body 120 and the object look interlocked with each other if a situation occurs in which it is difficult physically or in terms of setting to provide interlocking between both. The information processing block 30 selects a suitable scenario from the interlock scenario storage block 26 in accordance with a situation at the time such as setting and progress of a game and a position of the real body 120 for example and executes the selected scenario. Specific examples thereof will be described later. In a mode where the information processing apparatus 10 operates the real body 120, the information processing block 30 generates a necessary control signal and transmits the generated control signal to the real body 120 via the communication block 20.

At this moment, adding the individual identification information of the real body 120 of the transmission destination to the control signal in advance allows the real body 120 of the transmission destination to discriminate the control signal addressed to the real body 120 itself if wireless communication is executed when there are two or more real bodies 120. Signals that are specifically transmitted are various depending on control methods; namely, a technique that is generally used in the field of robotics for example may be used appropriately.

The display processing block 32 creates image data of a game screen including an object interlocking with the real body 120, a setting screen necessary for a game, and a menu screen and so on at a predetermined rate and outputs the created image data to the display apparatus 16 as a video signal. For a part of a game screen, an image taken by the camera 122 may be used. Further, the display processing block 32 may generate an image to be projected onto the play field 19 and output this data to a projector included in the display apparatus 16. Alternatively, the play field 19 may be configured by the screen of a tablet PC and an image to be displayed on the screen may be generated and outputted. Consequently, an explosion that cannot actually occur or a natural view that does not actually exist can be expressed also in a real world in which the real body 120 exists and a prohibited area to be described later can be shown.

Referring to FIG. 3, there is shown a diagram illustrating an example of a technique of interlocking the real body 120 with objects inside a screen in the information processing block 30. The upper part of the figure is a virtual space 3 built by the information processing block 30 and the lower part shows a real space 5 in which there are the real bodies 120a and 120b. The information processing block 30 first defines a real space three-dimensional coordinate system as the origin of a predetermined position of the real space 5. In the example shown, with one of the angles of the play field 19 as the origin, the plane of the play field 19 is the xy plane and the vertical direction is the z axis. In accordance with these coordinates, a world coordinate system (XYZ coordinate) of a virtual space expressed inside a screen is set.

If a positional relation between the play field 19 and the camera 122 is known, then, on the basis of a position of a figure in a taken image, the positional coordinate of the real bodies 120a and 120b in a coordinate system of the real space 5 is found. Next, an object of the first character 202a and an object of the second character 202b are arranged at positions corresponding to the positional coordinates of the real bodies 120a and 120b in the world coordinate system of the virtual space. In addition, as necessary, an object to be arranged around these above-mentioned objects is also arranged. Then, a virtual viewpoint is set to the virtual space 3 built as described above and each object viewed from this viewpoint is projected on a predetermined plane, thereby enabling to display a screen in which the first character 202a and the second character 202b are arranged at positions corresponding to the positions of the real bodies 120a and 120b.

Next, if the first character 202a is moved to the virtual space 3 by a user operation or the like through the input apparatus 14, then a moving velocity vector in the world coordinate system can be converted to a velocity vector in the three-dimensional coordinate system of the real space 5, thereby sequentially obtaining the direction in which the real body 120a is to be moved and an amount of the movement. Moving the real body 120a accordingly allows the reflection of the movement of the first character 202a onto the movement of the real body 120a.

Conversely, if the real body 120a is moved by the user, then converting the moving velocity vector in the three-dimensional coordinate system of the real space 5 into the velocity vector in the world coordinate system of the virtual space 3 allows the sequential acquisition of the direction in which the first character 202a is to be moved and an amount of the movement. Moving the first character 202a accordingly and drawing a manner thereof as a display screen allow the reflection of the movement of the real body 120a onto the movement of the first character 202a inside the screen. It should be noted that scale ratios and directional relations of the three-dimensional coordinate system of the real space 5 and the world coordinate system of the virtual space 3 are appropriately determined from the viewpoints of expression such as a ratio between an area of the play field 19 and an area of a virtual world to be expressed inside the screen and displaying a virtual world in the same direction as that of a real space or in a horizontally flipped manner.

The technique shown in FIG. 3 supposed that a complete virtual world be built inside a screen by use of three-dimensional graphics; however, use of a taken image for the background of a display image more simplifies the processing. Namely, the contour of the real body 120 in a taken image may be specified for each image frame by visual tracking processing or the like so as to superimpose and display an object to be interlocked onto the position of the specified contour. In this case too, objects to be arranged around the object to be interlocked may be further superimposed.

Referring to FIG. 4, there is shown an example of a data structure of information related with a real body to be stored in the real body information storage block 24. Real body information 50 includes an individual identification information column 52, a shape column 54, a color column 56, a size column 58, and a corresponding object column 60. The individual identification information column 52 stores the identification information given for each real body 120. This identification information is common to the identification information internally held by each real body 120. The shape column 54, the color column 56, and the size column 58 store the shape, color, and size of each real body 120 in predetermined formats. The real body state specification block 22 matches a figure in a taken image with these items of information so as to specify the individual identification information of each real body 120 and the detail features that are difficult to discriminate from a taken image. The relation between the individual identification information and the shape, color, and size is found at the time the individual identification information is allocated to each real body, so that this relation is set at the time of hardware manufacture or game software creation.

The corresponding object column 60 stores the identification information of an object inside a screen that is to be interlocked with the real body 120. In the diagram, an object name is stored; for example, the real body having individual identification information "0001" is related with the object of a "prince" character and the real body having "0002" is related with the object of "monster 1" character. As described above, each object is separately related with object models and built in a game program. The relation between the individual identification information of a real body and an object is fixed if a dedicated real body is manufactured for each object, so that this relation is set at the time of hardware manufacture or game software creation.

If a real body is not manufactured as a dedicated real body but is fixed in the settings of a game, then the real body is set at the time of game software creation in advance. Alternatively, a user may set the relation at the beginning of a game. In this case, a user makes the information processing apparatus 10 recognize the real body 120 subject to setting by making the camera 122 take an image of the real body 120 which is arranged on the play field 19 and, at the same time, selects a character to be interlocked from a character (object) selection screen displayed on the display apparatus 16. Accordingly, the information processing block 30 stores the above-mentioned relation into the real body information storage block 24 as shown in the diagram.

Figure 5:
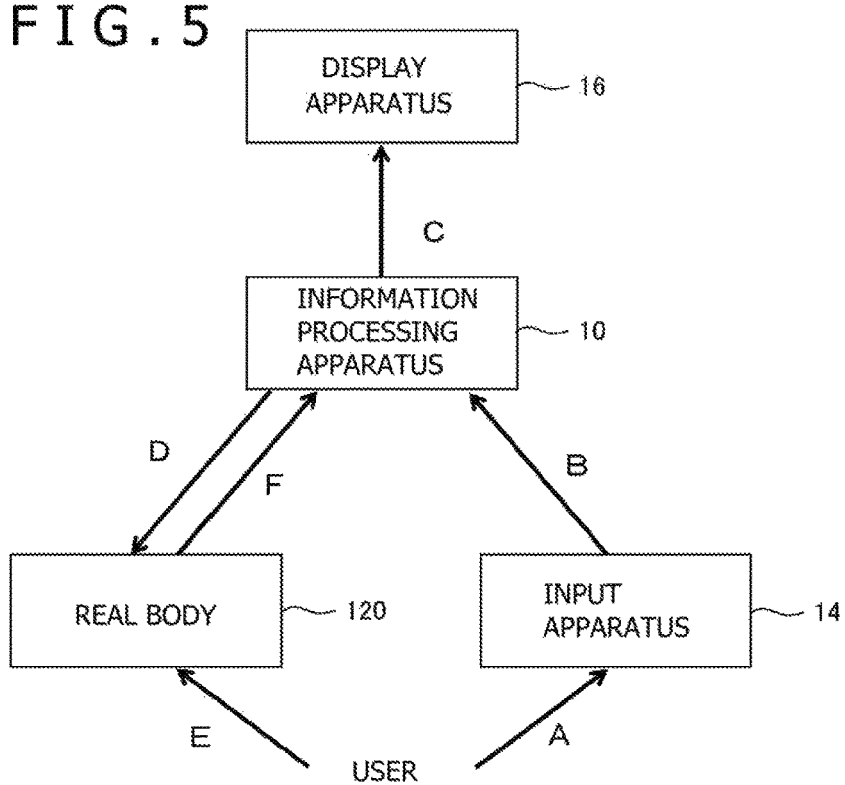
FIG. 5 is a diagram schematically illustrating an information transmission system in the present embodiment.

Referring to FIG. 5, there is schematically shown a system of information transmission in the present embodiment. First, as a first pattern, a user executes operations for a game being played on the information processing apparatus 10 through the input apparatus 14 (arrows A and B). As a result, the game progresses and a game screen involving corresponding changes is displayed on the display apparatus 16 (arrow C). At the same time, in the present embodiment, the information processing apparatus 10 moves the real body 120 like an object inside a game screen (arrow D).

When a user moves the real body 120 as a second pattern, the information processing apparatus 10 recognizes the movement thereof (arrows E and F). Then the information processing apparatus 10 moves an object corresponding to the game screen being displayed on the display apparatus 16 like the movement of the real body 120 (arrow C). In either pattern, a unique manner of interlocking a real body with an object inside a screen is executed, so that a trouble that never occurs in general computer games and toy plays may happen.

Figure 6:
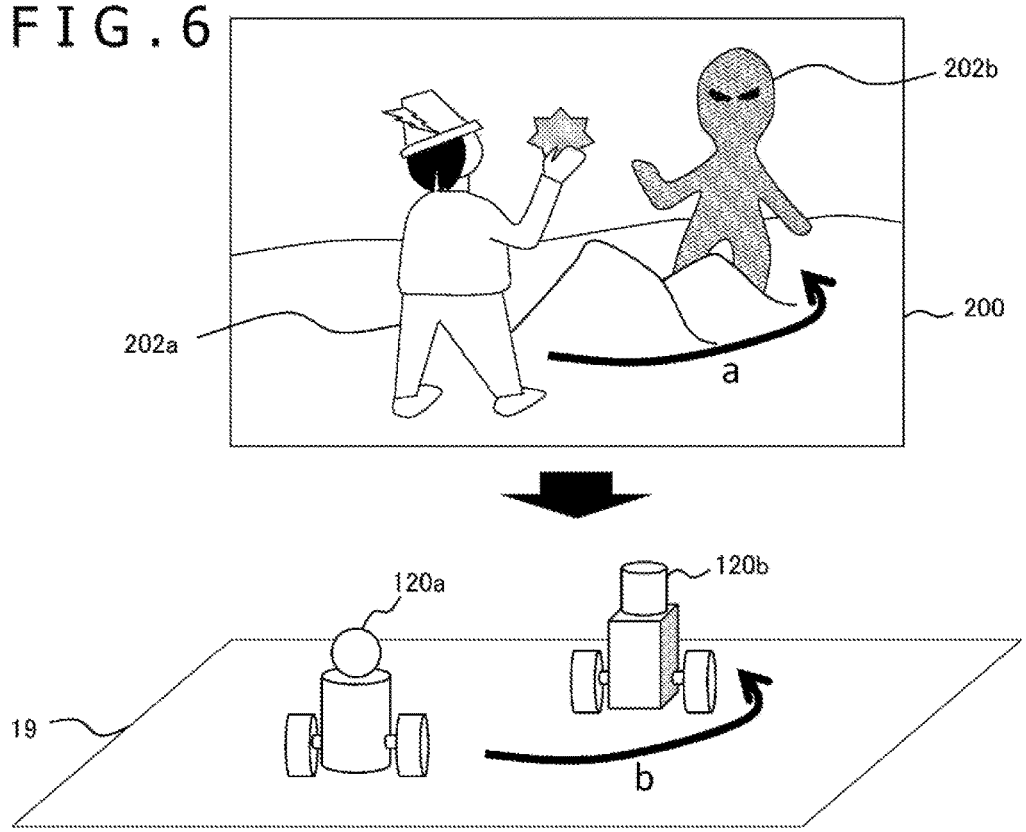
FIG. 6 is a diagram illustrating a relation between a display screen and real bodies in a first pattern of the present embodiment.

Referring to FIG. 6, there is shown an example of a relation between a display screen and real bodies in the first pattern. This example supposes a combat game in which it is assumed that the first character 202a and the second character 202b are fighting in a screen 200. As with shown in FIG. 1, the first character 202a and the second character 202b are related with the real body 120a and the real body 120b, respectively. For example, the first character 202a is operated by the user through the input apparatus 14 and the second character 202b is moved by the information processing apparatus 10 as instructed by a program as an enemy character. Alternatively, two users may move the characters respectively by use of two input apparatuses 14.

In any case, if the first character 202a moves line arrow a by the user operation through the input apparatus 14, the information processing apparatus 10 is required also to move the real body 120 in the same manner. At this moment, if the first character 202a is gradually moved inside the screen with a direction key or a joy stick of the input apparatus 14, then the movement direction and movement amount in the real world may be sequentially computed by coordinate-converting a velocity vector as described above. The information processing apparatus 10 transmits control signals continuously to the real body 120a on the basis of the results of the computation, thereby moving the real body 120a along arrow b to be interlocked with the first character 202a.

On the other hand, if an operation to warp the first character 202a, namely, an operation for instantaneously moving the character by specifying a goal in a virtual world is executed, it is impossible to physically warp the real body 120a in the same manner. Therefore, following scenarios are prepared:
(1) a real body is moved along the shortest route to a position that corresponds to a goal in the virtual world; and
(2) during the movement of the real body, a predetermined image is displayed.

Above-mentioned (1) denotes that the real body 120a is moved along the shortest route even if there is an obstacle or no road in the virtual world unless there is such an obstacle in the real world. Consider that the first character 202a is moved on a screen 200 shown in FIG. 6 with the goal being the proximity of the second character 202b, then, in the virtual world inside the screen, there is an obstacle like a rock between the first character 202a and the second character 202b. On the other hand, in the real world, there is no such an obstacle, so that the first character 202a is linearly moved toward the second character 202b. If there actually is an obstacle, the shortest route up to a goal is derived by an existing shortest route search method. Consequently, a game lag time involved in the movement of a real body can be reduced.

Above-mentioned (2) denotes that such changes unique to the duration of the movement of a real body are caused on a display screen as darkening of a game screen, displaying of a moving image indicative that movement is on, providing effect processing such as causing fog. This arrangement allows clearing of a state in which a game screen is frozen for waiting the completion of real body movement, thereby mitigating the stress of the user. The above-mentioned (1) and (2) are not mutually exclusive, so that both processings may be executed at the same time or only one may be executed in some cases.

Further, if the movement is not caused by the above-mentioned warp operation done by a user, but if it is required by the setting to arrange an object inside a screen in a determined manner at a predetermined position at the time of a scene switching, the beginning of a new fight in a board game and the like, some representation may be performed on the side of a real body. For example, if comparatively large number of real bodies such as of a troop are arranged in predetermined manner, these real bodies may march in formation inside a play field to be finally arranged in a predetermined manner, although these real bodies can be instantaneously arranged inside a screen. By representing the movement itself of real bodies in a manner of attracting interest, a joy other than playing game may be provided to the users by use of a wait time.

Figure 7:
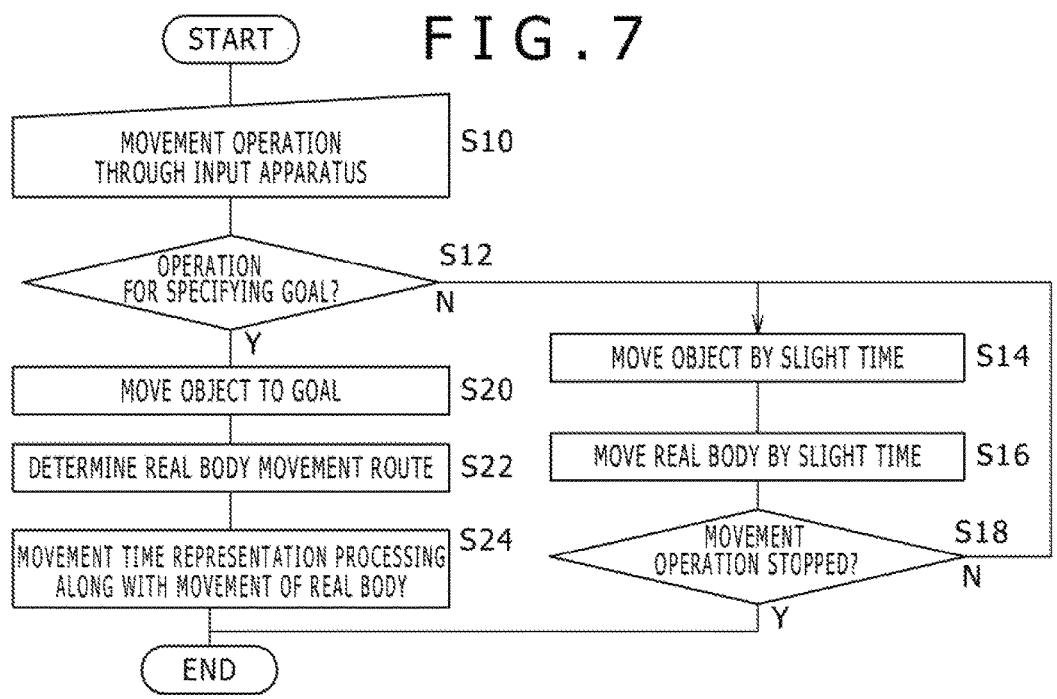
FIG. 7 is a flowchart indicative of a processing procedure for interlocking a real body when moving an object inside a screen by use of an input apparatus in the present embodiment.

Next, operations of the information processing apparatus 10 to be executed in the first pattern are described below. Referring to FIG. 7, there is shown a flowchart indicative of a processing procedure of interlocking a real body in moving an object inside a screen by use of the input apparatus 14. In this flowchart, the processing flow starts any time when the information processing apparatus 10 is executing a game. First, the user executes an operation of moving the object by use of the input apparatus 14 (S10), the information processing block 30 makes user whether the operation done is a warp operation for specifying a goal or not (S12). If the operation is found to be not a warp operation, namely, the operation is found to be a gradual movement (N of S12), then the object inside the screen is moved by slight time (S14). At the same time, the real body is moved in a corresponding movement direction and with a corresponding amount of movement (S16). This interlocking processing by slight time is repeated until the movement operation stops (N of S18) and, when the movement operation stops, the processing exits (Y of S18).

In the case of a warp operation for specifying a goal (Y of S12), the information processing block 30 instantaneously moves the object inside the screen to the goal (S20). At this time, effect processing indicative that a warp operation has been done may be executed. At the same time, the information processing block 30 specifies a position of the real world corresponding to the goal in the virtual world and searches for the shortest route up to that position, thereby determining a movement route of the real body 120 (S22). Then, a predetermined moving image is displayed and effect processing is executed on the screen while moving the real body 120 along this route and exits the processing upon completion of the movement (S24). As described above, if a real body is rearranged, the processing is started from Y of S12. Alternatively, as described above, such a representation is provided as some regularity on the movement itself of a real body. From among the specific scenarios stored in the interlock scenario storage block 26, the information processing block 30 selects processing in accordance with an actual situation and executes the selected processing in S22 and S24.

Figure 8:
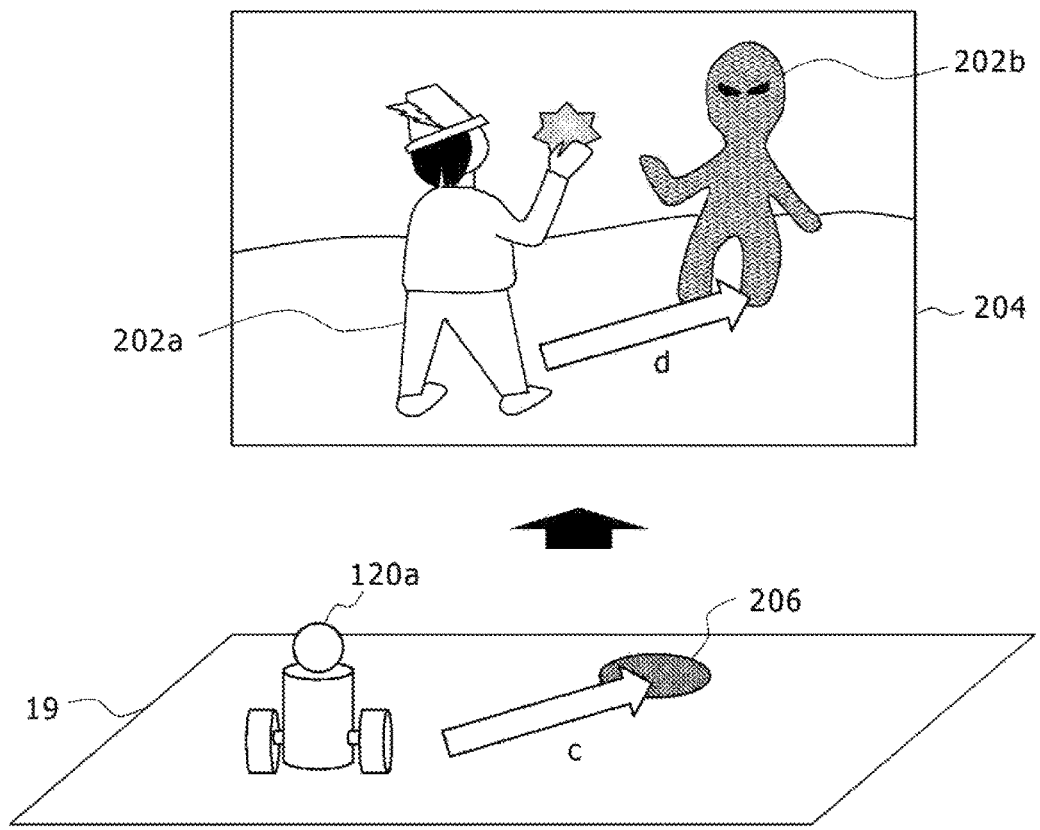
FIG. 8 is a diagram illustrating a relation between a display screen and real bodies in a second pattern of the present embodiment.

Referring to FIG. 8, there is shown a diagram illustrating a relation between a display image and a real body in the second pattern described with reference to FIG. 5. In this example, a combat game like that shown in FIG. 6 is assumed, in which the first character 202a and the second character 202b are fighting each other in a screen 204. On the other hand, in a real world, there is the real body 120a related with the first character 202a, while there is no real body related with the second character 202b, which is a difference from the example shown in FIG. 6. That is, the second character 202b exists as an enemy character only in the screen that is operated by the information processing apparatus 10 as instructed by a program.

In such a situation as described above, it is assumed that the user moved the real body 120a in the direction of the arrow c. At this moment, the information processing apparatus 10 is required to likewise move the first character 202a in the screen in the direction of the arrow d. However, if the movement of the real body 120a reaches a place 206 corresponding to the second character 202b, a trouble occurs. Specifically, since there is no real body corresponding to the second character 202b in the real world, it is physically impossible for the real body 120a to exist at the place 206. On the other hand, if the first character 202a is likewise moved inside the screen, overlapping occurs with the second character 202b, thereby disabling drawing. This denotes that a real body is arranged in an area (hereafter referred to as a prohibited area) corresponding to a place like a mountain, a water surface, and a building as well as a position of an enemy character where no character can exist without change, thereby disabling the reflection of the state of a real world onto the game screen.

Therefore, if a real body moved by the user has reached a prohibited area or a predetermined range around a prohibited area, there are provided following scenarios:
(1) an error message is outputted;
(2) an information processing apparatus is made move a real body outside a prohibited area;
(3) a virtual world is changed not to be a prohibited area; and
(4) a standby real body is moved to be arranged in a prohibited area.

The above-mentioned (1) prompts the user to move the real body 120a from the prohibited area by notifying the user that the real body 120a has entered a prohibited area. Because the user is touching the real body 120a, the user may be notified of the entry in the prohibited area by vibrating a vibrator built in the real body 120a. Alternatively, an alert may be given by making a light emission body built in the real body 120a emit light, making an installed display show a predetermined image, or making a speaker generate a predetermined audio. Still alternatively, a predetermined image such as a message may be displayed on the display apparatus 16 or a predetermined audio may be generated from a speaker built in the display apparatus 16. Yet alternatively, two or more of these alerting means may be combined. Upon an alert, the user can easily take the real body 120a out of the prohibited area by moving the real body 120a while viewing the screen 204. The above-mentioned (2) denotes that the real body 120a is forcibly moved out of the prohibited area by a control signal issued from the information processing apparatus 10.

The above-mentioned (3) denotes that, if the prohibited area is caused by the existence of the enemy character 202b as shown, the prohibited area itself is moved by moving this enemy character 202b. Objects other than the enemy character can also be likewise moved if these objects are moving objects. In the case of a mountain or a building that are not moving, the prohibited area is cleared by making a character stand on the mountain or the building by crumbling or shortening it. The above-mentioned (4) denotes that a standby real body representative of a prohibited area is prepared around the play field 19 as a rule and, when the real body 102a moved by the user enters a predetermined range of the prohibited area, this standby real body is moved by a control signal issued from the information processing apparatus 10 to be arranged in the prohibited area. Consequently, entering of the real body 120a is physically prevented from entering the prohibited area.

It should be noted that, if, when a game or the like is being played in the first pattern, a trouble occurs in which there arises a confusion with the second pattern in which the user moves the real body by his or her own hand, an alert may be given to the user by use of the above-mentioned (1). For example, in the game shown in FIG. 6, it is possible that the user directly moves by his or her hand the real body 120a or the like that is supposed to be gradually moved by a user operation through the input apparatus 14. However, this causes an inconsistency between the display image and the real body especially in a game where no warp is assumed. When such an illegal movement of the real body is detected by the real body state specification block 22, the user is warned of an illegal movement by use of any of the above-mentioned means. Alternatively, a penalty may be imposed by deducting points for example in the game as an illegal action. This allows the user to follow rules, thereby preventing the inconsistency caused by the confusion between the first pattern and the second pattern.

Figure 9:
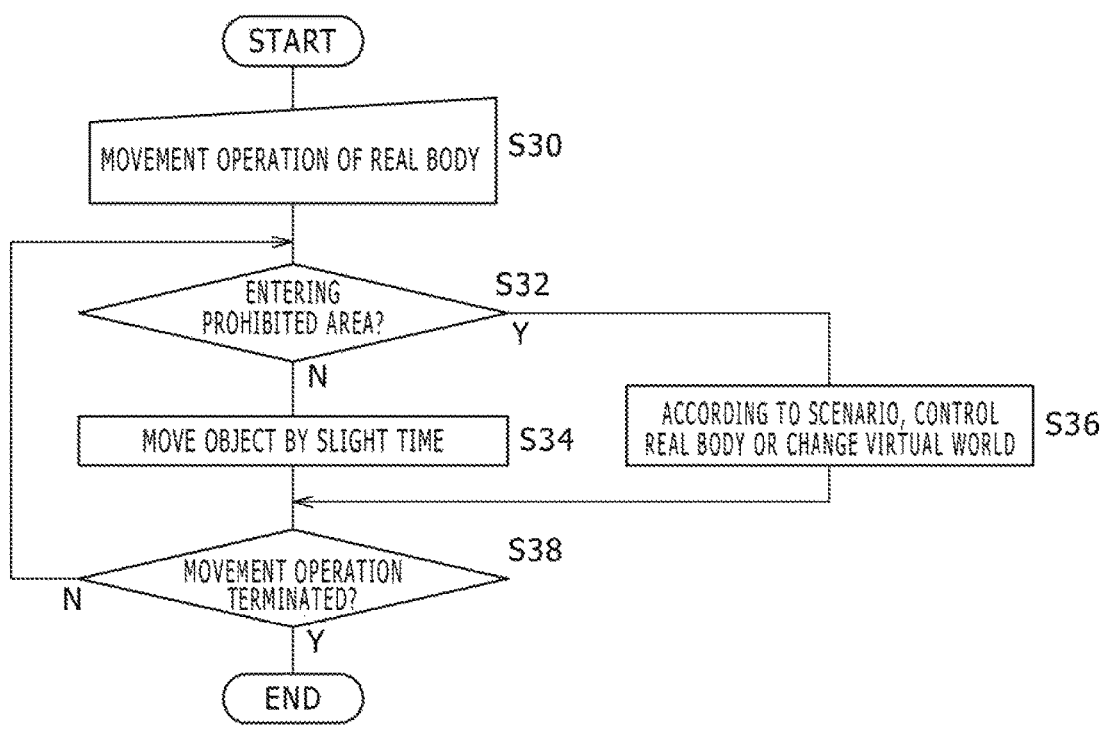
FIG. 9 is a flowchart indicative of a processing procedure for interlocking objects inside a screen while taking a prohibited area into consideration when moving a real body by a user in the present embodiment.

Next, operations to be executed by the information processing apparatus 10 in the second pattern are described. Referring to FIG. 9, there is shown a flowchart indicative of a processing procedure of providing interlocking among objects inside a screen by considering a prohibited area when the user moves real bodies. This flowchart is started any time in a situation where the information processing apparatus 10 is executing a game. First, when the user has moved a real object (S30), the information processing block 30 monitors whether this real body enters in the prohibited area or not (S32). It should be noted that the information processing block 30 determines from time to time the position and size of the prohibited area in accordance with objects around a virtual area, the movement of an enemy character, and so on.

While the real body is kept away from the prohibited area (N of S32), the object inside the screen is moved in the movement direction and movement amount corresponding to the real body for each slight time (S34). This interlocking processing by slight time is repeated until the movement operation for the real body is terminated (N of S38). If the real body enters the prohibited area halfway through the movement processing or the like (Y of S32), then the real body is controlled or the virtual world is changed in any one of the above-mentioned processings (1) through (4) or a combination thereof (S36). Subsequently, while the real body is outside the prohibited area, the object is interlocked and, when the real body enters the prohibited area, the processing according to the selected scenario is repeatedly executed (S32 through S36) and, upon the end of the movement of the real body, the processing is exited (Y of S38). Of the specific scenarios stored in the interlock scenario storage block 26 in advance, the information processing block 30 executes, in S36, the processing selected according to an actual situation.

Each of the above-mentioned scenarios is the processing to be executed when a real body has reached a prohibited area or a predetermined range around a prohibited area; however, it is also practicable to indicate a prohibited area as a real world regardless of the position and movement of a real body. To be more specific, a projector or a tablet PC is separately introduced for the display apparatus 16 to project or display an image on the play field 19. This image may be an image with the prohibited area being painted in a predetermined color like the place 206 shown in FIG. 8 for example or an image representing a mountain or a building, its shape in an as-is manner. Projecting such an image onto the real world makes a prohibited area clear and, when the user moves the real body, allows the user to easily avoid the prohibited area. This is especially effective in a mode where there are two or more prohibited areas or the movement is frequently executed.

Figure 10:
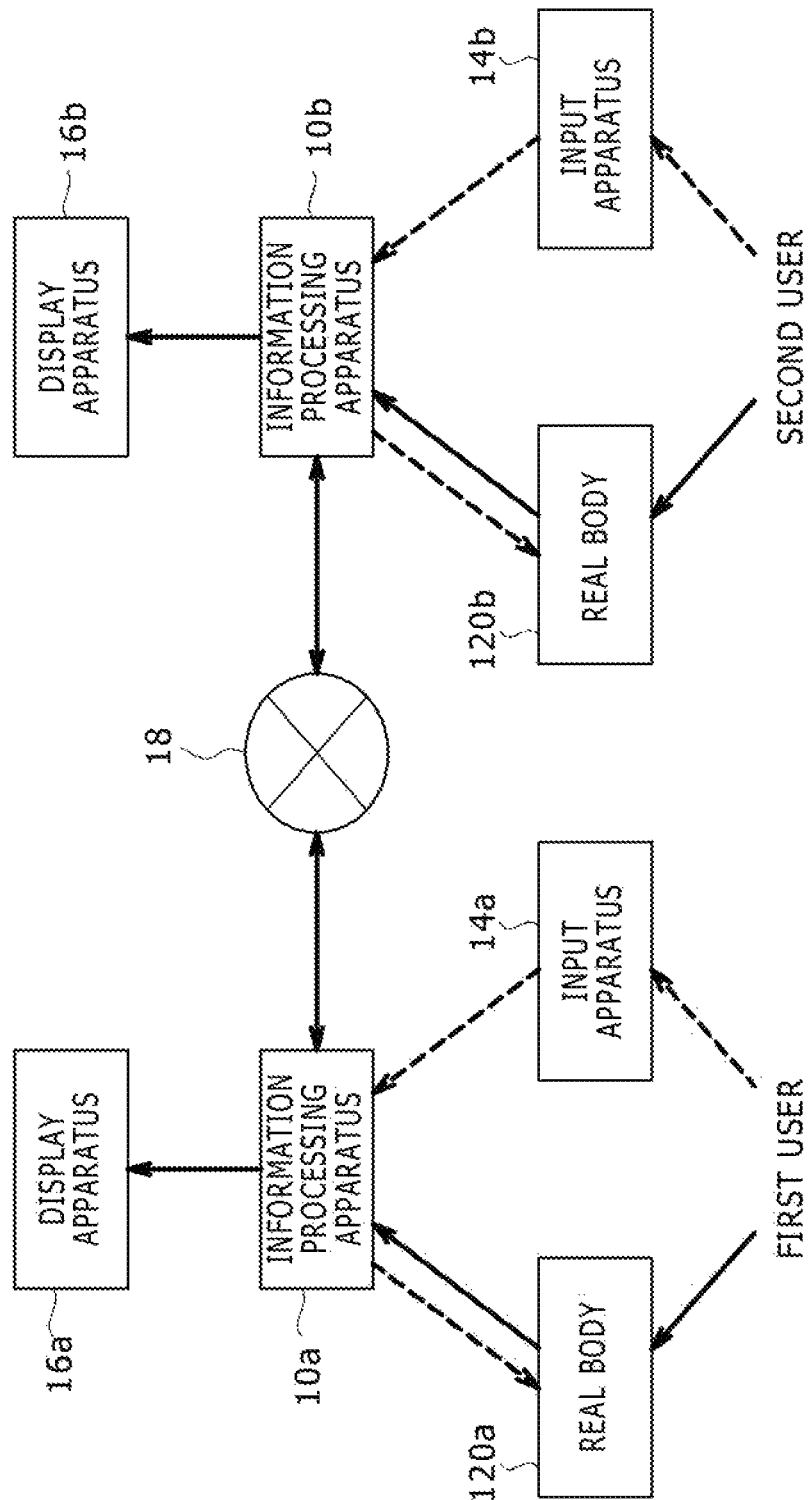
FIG. 10 is a diagram schematically illustrating an information transmission system in a mode in which a competition game is played by use of two information processing apparatuses interconnected via a network in the present embodiment.

The following describes a competition game to be played through a network as a typical example of the above-mentioned mode. Referring to FIG. 10, there is shown a diagram schematically illustrating a system of an information transmission in a mode in which a competition game is played by use of two information processing apparatuses 10 connected with each other through a network. As shown, an information processing apparatus 10a that is used by a first user and an information processing apparatus 10b that is used by a second user are connected with each other through the network 18. As shown in FIG. 5, the users operates the input apparatuses 14a and 14b and the real bodies 120a and 120b to make the information processing apparatuses 10a and 10b execute information processing, thereby changing the displays on the display apparatuses 16a and 16b and operating the real bodies 120a and 120b. However, it is assumed here that the competition game be played in the second pattern, namely, by moving the real bodies 120a and 120b by the users, so that the information transmission routes that are used only in the first pattern are indicated by dashed lines.

At this moment, the objects that are displayed on the display apparatus 16a of the first user include an object corresponding to the real body 120b to be operated by the second user in addition to an object corresponding to the real body 120a to be operated by the first user. Likewise, the objects that are displayed on the display apparatus 16b of the second user include an object corresponding to the real body 120a to be operated by the first user in addition to an object corresponding to the real body 120b to be operated by second user. Therefore, the information processing apparatuses 10a and 10b sequentially acquire the positional information of the opponent real bodies specified by the real body state specification blocks 22 of the opponent information processing apparatuses 10a and 10b, respectively. Next, the information processing blocks 30 of the information processing apparatuses 10a and 10b process the same program in accordance with the movements of both the real bodies, thereby making the competition game go on in the same way on both sides.

Figure 11:
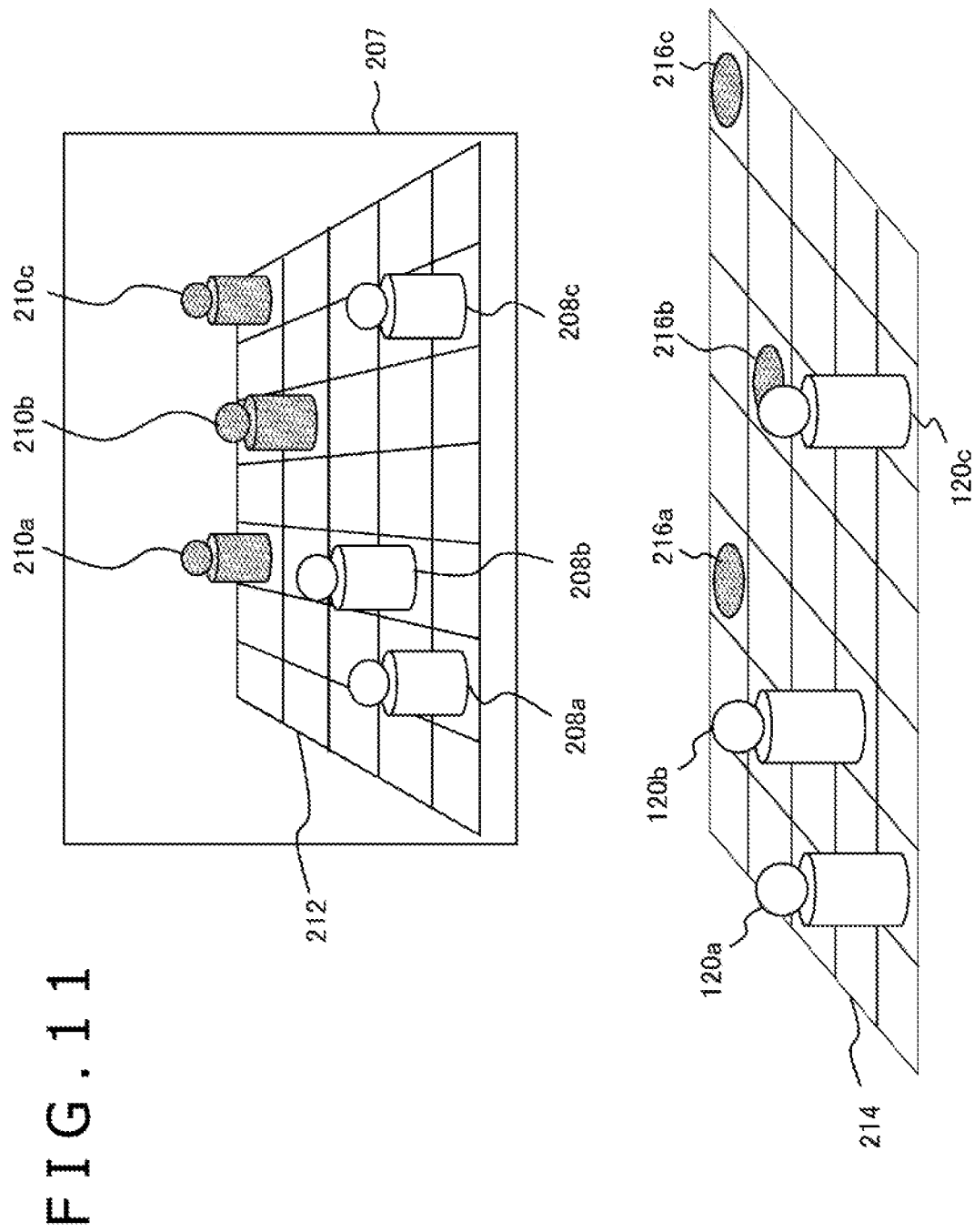
FIG. 11 is a diagram illustrating a relation between a display image and real bodies in a competition game played via a network in the present embodiment.

Referring to FIG. 11, there is shown a diagram illustrating relations between display images and real bodies in a competition game that is played through a network. This example assumes a board game such as chess, in which, in a screen 207, own pieces 208a, 208b, and 208c while opponent pieces 210a, 210b, and 210c are arranged on a game board 212 of a virtual world. It should be noted that an image with the game board 212 viewed from the reverse side is displayed on the screen of the opponent user. Of the pieces inside the screen, the own pieces 208a, 208b, and 208c are operated by moving the real body 120a, 120b, and 120c arranged on the game board 214 of the real world. On the other hand, there is no real body that corresponds to any of opponent pieces 210a, 210b, and 210c.

Therefore, of the squares of the game board 214 in the real world, an image is projected onto the game board 214 by use of a projector such that filled graphics 216a, 216b, and 216c are displayed in the squares corresponding to the squares in the opponent pieces are arranged. Alternatively, this image is displayed on a screen of a tablet PC making up the game board 214. Consequently, even if there is no real bodies of opponent pieces, each square in which the real body of own piece cannot be arrange can easily by recognized. It should be noted that, in the case of FIG. 11, the real bodies 120a, 120b, and 120c and the pieces 208a, 208b, and 208c in the virtual world are all of the same shape; however, if roles of pieces are different from each other like chess, the real bodies and the pieces in the virtual world may be shapes that reflect roles. At the same time, the graphics that are projected by a projector or displayed on a tablet PC may be changed according to the types of arranged pieces.

As a result, each user can recognize by viewing only the game board 214 of the real world that a square concerned is a prohibited area and, like an actual board game, which type of a piece is arranged at which position. Instead of the image projection by a projector, representation may be made as if opponent pieces were present on the game board 214 of the real world by use of a head-mounted display of light transmission type. If all the situation of a game can be represented on the game board 214 of the real world, the displaying of the screen 207 by use of a display may be omitted.

As the number of squares and pieces increases, it becomes more difficult only on the screen 207 to grasp the relation between the positions of opponent pieces and own pieces, so that the effects of the projection of an image onto the game board 214 of the real world become more apparent. In addition, it is also practicable to further connect an information processing apparatus (not shown) of a third user who views such a competition game and project the pieces of both the first user and the second user onto a game board placed in front of this third user. In this case, the positional information of the real bodies of the first user and the second user specified by the real body state specification blocks 22 of the information processing apparatuses 10a and 10b is transmitted to the information processing apparatus 10 of this third user via the network 18. In response, the information processing apparatus 10 of the third user sequentially generates images representative of the positions of the pieces and projects or displays, in graphics discriminating the pieces of both users, onto the game board of the real world.

Competition games based on networks are not limited to board games as shown above, may be applicable to combat games, car race games, various sport games, and so on. Further, the number of game players is not limited to two. It should be noted that, if a real body has reached a prohibited area or entered a predetermined range around a prohibited area without use of a projector in such as mode, then any of the above-mentioned scenarios (1) through (4) may be executed.

Figure 12:
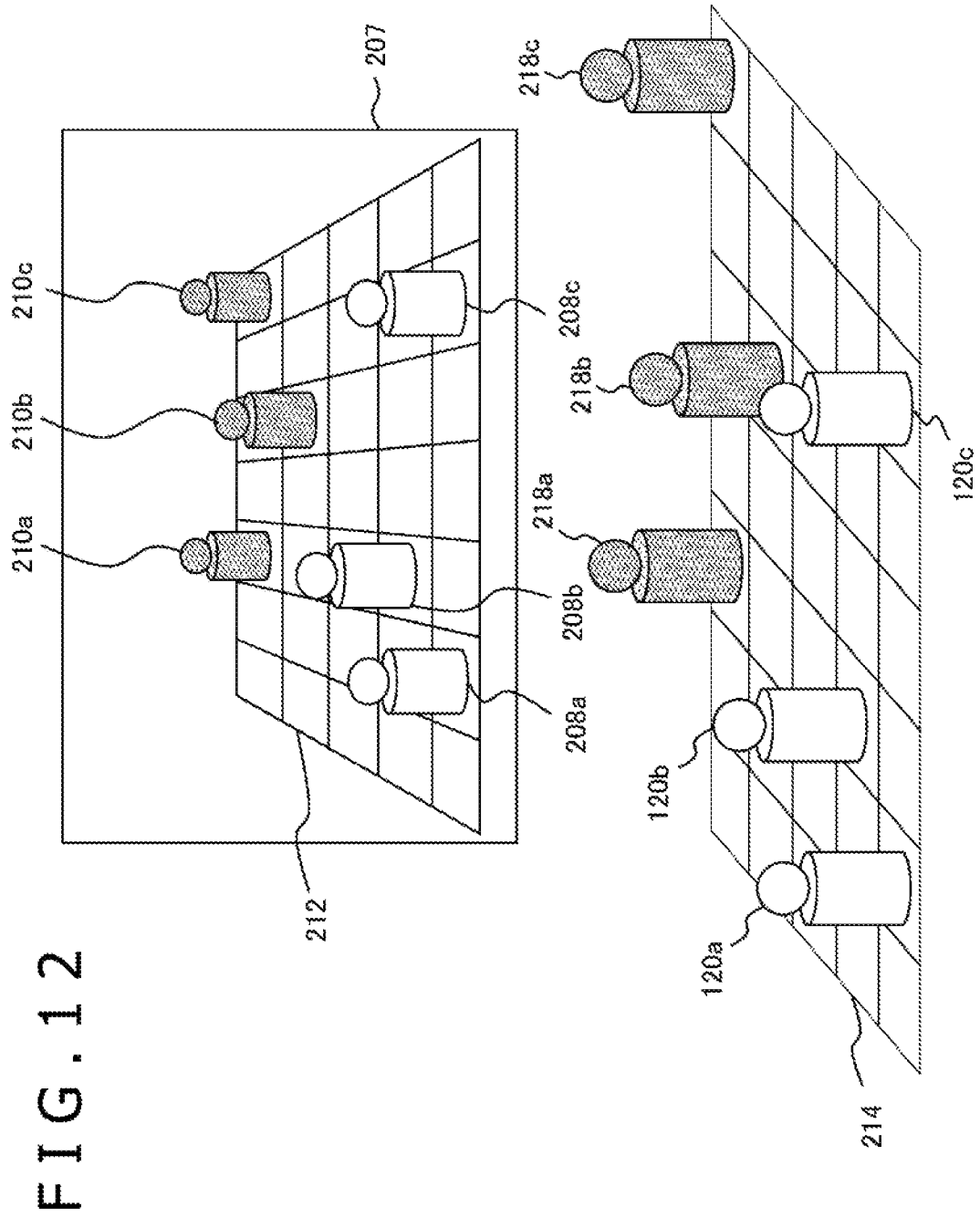
FIG. 12 is a diagram illustrating a relation between a display image and real bodies when real bodies corresponding to opponent pieces are also arranged on a game board in a real world in the present embodiment.

Referring to FIG. 12 as a modification example of the mode described with reference to FIG. 11, there is shown a diagram illustrating a relation between a display screen and real bodies when real bodies corresponding to the opponent pieces are also arranged on a game board of the real world. That is, of the pieces shown in the screen 207, in addition to the real bodies 120a, 120b, and 120c corresponding to the own pieces 208a, 208b, and 208c, the real bodies 218a, 218b, and 218c corresponding to the opponent pieces 210a, 210b, and 210c are also arranged on the game board 214 of the real world. In this case, a mode is entered in which, when the opponent moves pieces at a remote place, the opponent pieces 210a, 210b, and 210c inside the screen 207 moves in an interlocking manner and, at the same time, the corresponding real bodies 218a, 218b, and 218c automatically move.

For this reason, acquiring the movements of the opponent real bodies through the network 18, the information processing apparatuses 10a and 10b transmit controls signals to these real bodies so as to reflect the acquired movements onto the real bodies 218a, 218b, and 218c arranged in front of the user. In this case, it is required to provide a mechanism in which the user cannot move the real bodies 218a, 218b, and 218c corresponding to the opponent pieces even if these real bodies are in front of the user. For example, a mechanism is arranged on the real bodies 218a, 218b, and 218c that detects the movement of a piece by an external force or the touch on a piece; if such an event is detected, a built-in vibrator is vibrated or a light emitting element is made emit light, thereby giving an alert to the user. Alternatively, the information processing apparatus 10 may provide control such that an error message is outputted on the basis of output audio from real bodies or the screen of the display apparatus 16 or moved pieces are returned to the original positions.

Figure 13:
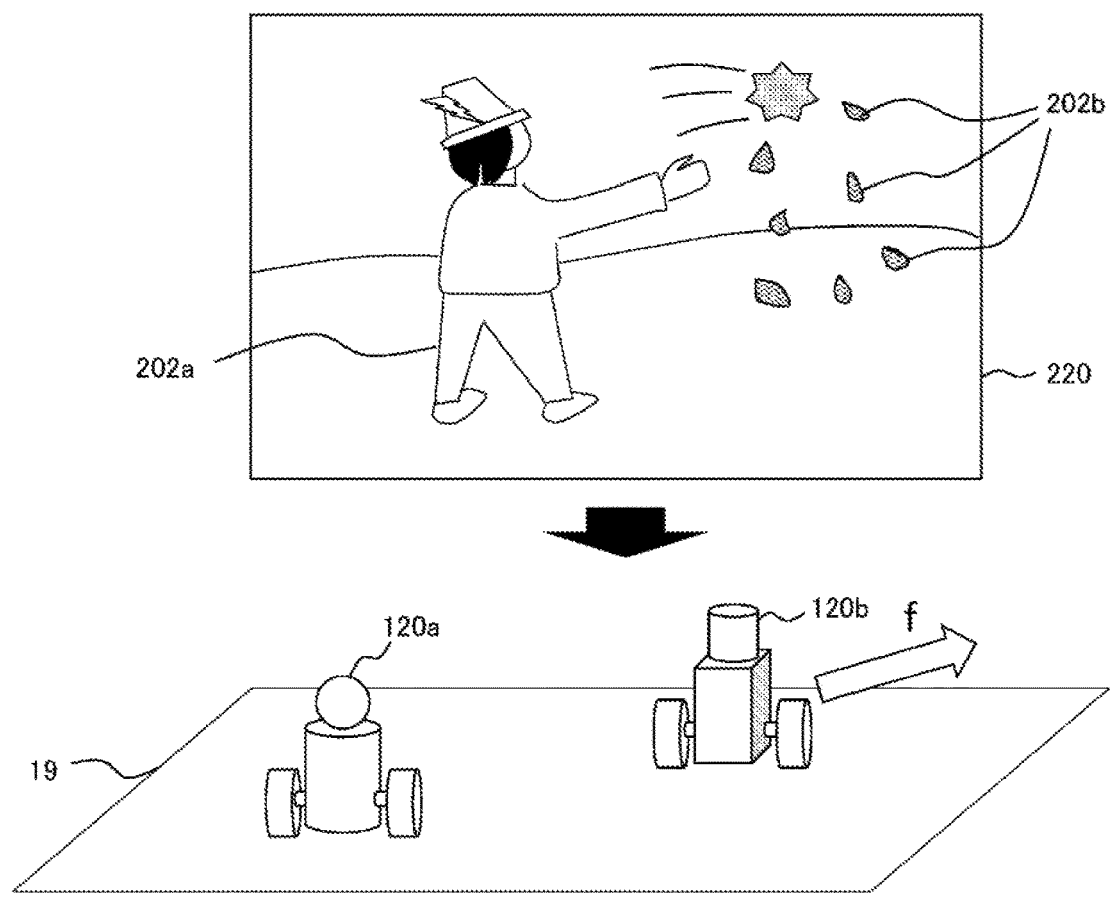
FIG. 13 is a diagram illustrating a relation between a display image and real bodies in a situation in which objects in a virtual world disappear in the present embodiment.

Regardless of whether the user operates the input apparatus 14 or moves real bodies, situations are possible in which inconsistencies occur between the virtual world on the screen and the real world in addition to those described above. One example is disappearance or appearance of objects in a virtual world. Referring to FIG. 13, there is shown a diagram illustrating a relation between display images and real bodies in a situation in which objects disappear in a virtual world. This example assumes combat games illustrated in FIG. 6 and FIG. 8, in which, in a screen 220, a second character 202b disappears (broken up into fragments in the diagram) due to the attack by the first character 202a.

In the above-mentioned case, the real body 120b corresponding to the second character 202b cannot be disappeared likewise, so that the real body 120b exists at a place where there is nothing in a virtual world, thereby causing inconsistency between the virtual world and the real world. For this reason, the following scenarios are prepared for coping with situations in which the objects in the screen corresponding to the real body 120b are disappeared or destroyed:

(1) a message is outputted to the user;
(2) the real body corresponding to the object concerned is moved by the information processing apparatus from the play field to the outside; and
(3) presentation is made such that a wreck remains in the virtual world.

The above-mentioned (1) denotes that a message for prompting the user to move the real body 120b corresponding to an object that has disappeared or destroyed from the play field 19 to the outside is given to the user through screen display, audio, or light emission of the real body 120b. The above-mentioned (2) denotes that the information processing apparatus 10 transmits a control signal to the real body 120b so as to move the real body 120b concerned outside the play field 19. In the example shown in FIG. 13, is real body 120b is moved in the direction of the arrow f, thereby ejecting the real body 120b from the play field 19. In each of (1) and (2), the real body 120b does not become an obstacle to the movement of the real body 120a in the subsequent play of the game. As a result, consistency can be provided between the movable range of the first character 202a remaining in the virtual world and the movable range of the real body 120a in the real world. If a new object is made appear in the virtual world, the user is prompted to move a standby real body prepared around the play field or the information processing apparatus 10 moves a standby real boy in the direction opposite to the arrow f, thereby adding a real body to the play field 19.

The above-mentioned (3) denotes that representation is made such that, with the real body 120b left without change, the wreck of the character 202*b* concerned is kept in the virtual world. In this case, the real body 120*b* provides an obstacle to the real body 120*a* corresponding to the remaining first character 202*a*, but the real body 120*b* provides an obstacle to the movement of the first character 202*a* as a wreck also in the virtual world, so that the consistency between the both movable ranges is promised. In this case, projecting an image representative of the wreck onto the real body 120*b* through a projector allows intuitive understanding that the real body 120*b* concerned is not a thing that is moved or moves any further.

If the number of objects that disappear like pieces of a board game is comparatively large or in the case of a game in which it is improper to leave wrecks, (1) or (2) is selected. On the other hand, in the case of a game that is high in the freedom of representation in a virtual world like a role playing game, (3) is selected. Thus a scenario is appropriately selected in accordance with the contents and situations of a game.

The examples described above have an aspect that consistency is provided by mediation of the information processing apparatus 10 in order to always interlock the originally independent two worlds with each other, namely a real world to be changed by use of the real body 120 and a virtual world that is changed by use of the input apparatus 14. On the other hand, it is also practicable to use these two worlds in a complementary manner so as to eliminate the occurrence itself of the above-mentioned troubles associated with the consistency between both the two worlds. To be more specific, the range of the influence of an operation of the real body 120 is separated from the range of influence of an operation through the input apparatus 14, thereby integrating only the necessary information. For example, a scene in which an object inside the screen moves by the operation of the real body 120 is separated from a scene in which an operation through the input apparatus 14 is accepted, the latter being a scene in which the interlocking of the real body 120 is not involved.

Figure 14:
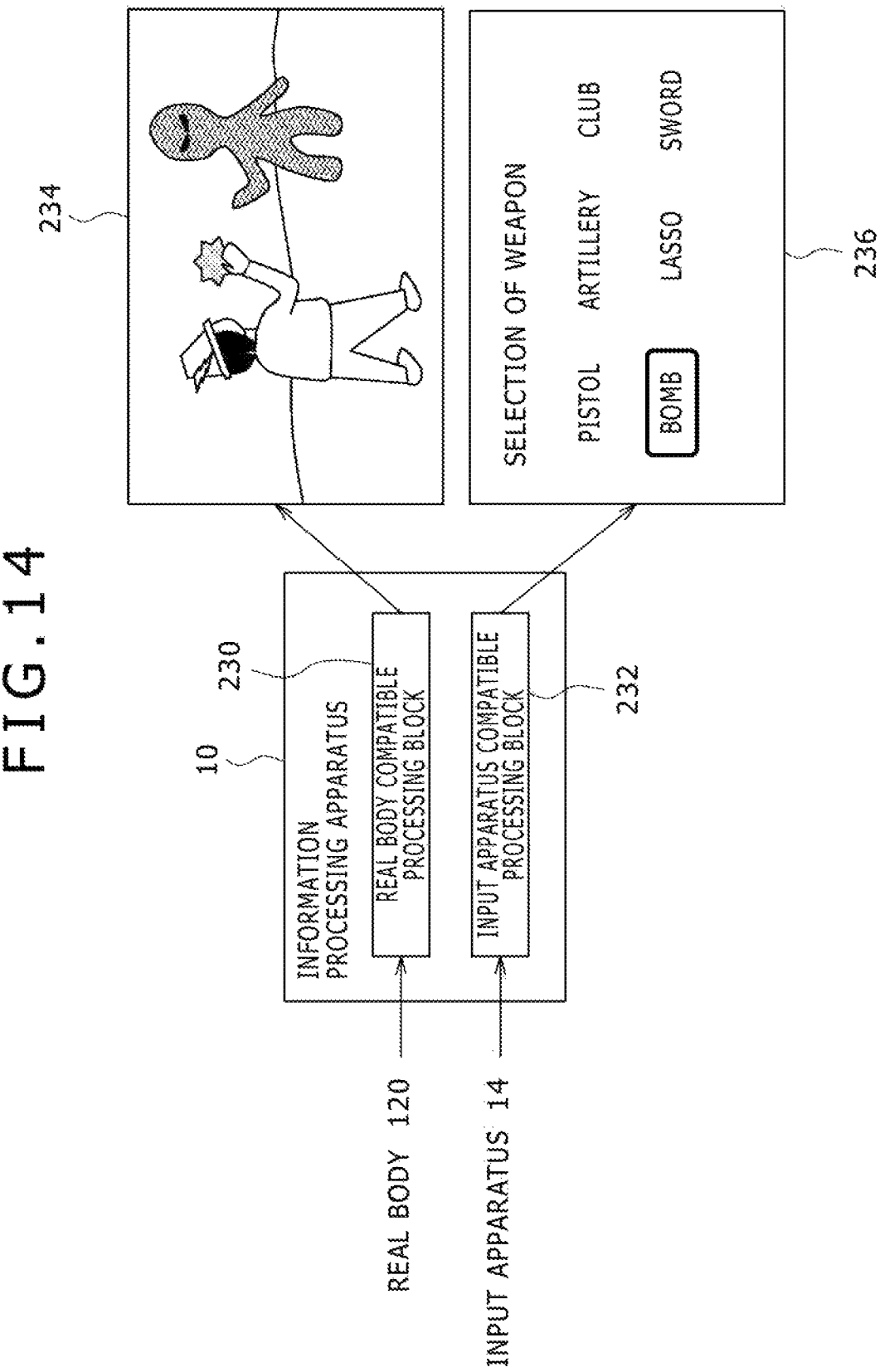
FIG. 14 is a diagram schematically illustrating a configuration of an information processing apparatus and an exemplary display screen in a mode in which scenes are divided by operating means in the present embodiment.

Referring to FIG. 14, there is shown a diagram schematically illustrating examples of a configuration of an information processing apparatus and a display screen in a mode in which scenes are separated from each other by operating means. In this mode, the information processing apparatus 10 includes a real body compatible processing block 230 for executing information processing in accordance with the movement of the real body 120 so as to generate a display image and an input apparatus compatible processing block 232 for executing information processing in accordance with a user operation through the input apparatus 14 so as to generate a display image. Of the configuration of the information processing apparatus 10 shown in FIG. 2, the real body compatible processing block 230 is made up of the communication block 20, the real body state specification block 22, the information processing block 30, the display processing block 32, and the real body information storage block 24. The input apparatus compatible processing block 232 is made up of the information processing block 30 and the display processing block 32. It should be noted that the information processing block 30 need not generate control signals for operating real bodies.

The real body compatible processing block 230 generates a screen 234 of a virtual world in which an object that moves when the user moves the real body 120 appears. The input apparatus compatible processing block 232 generates a screen 236 that accepts a user operation through the input apparatus 14. In the example shown in this diagram, the screen 234 is a screen showing the on-going combat in a combat game also shown in FIG. 6 while the screen 236 is a screen on which a weapon to be selected by the own character before starting a combat. Screen switching is executed such that, during the playing of the game, normally a virtual world such as the screen 234 is displayed and the screen 236 is displayed only when the user calls a weapon selection screen through the input apparatus 14 or the like. Alternatively, both the screens may be displayed at the same time, the active screen being selectable through the input apparatus 14.

In any case, if the characters inside the screen 234 do not move through the input apparatus 14, there is no need to move the real body 120 accordingly, so that the consistency between the real world and the virtual world is always maintained as a result. It should be noted that the input apparatus 14 can be used if an operation does not directly affect the movement of each character in addition to a selection operation for a selection screen shown and a screen switching operation.

Figure 15:
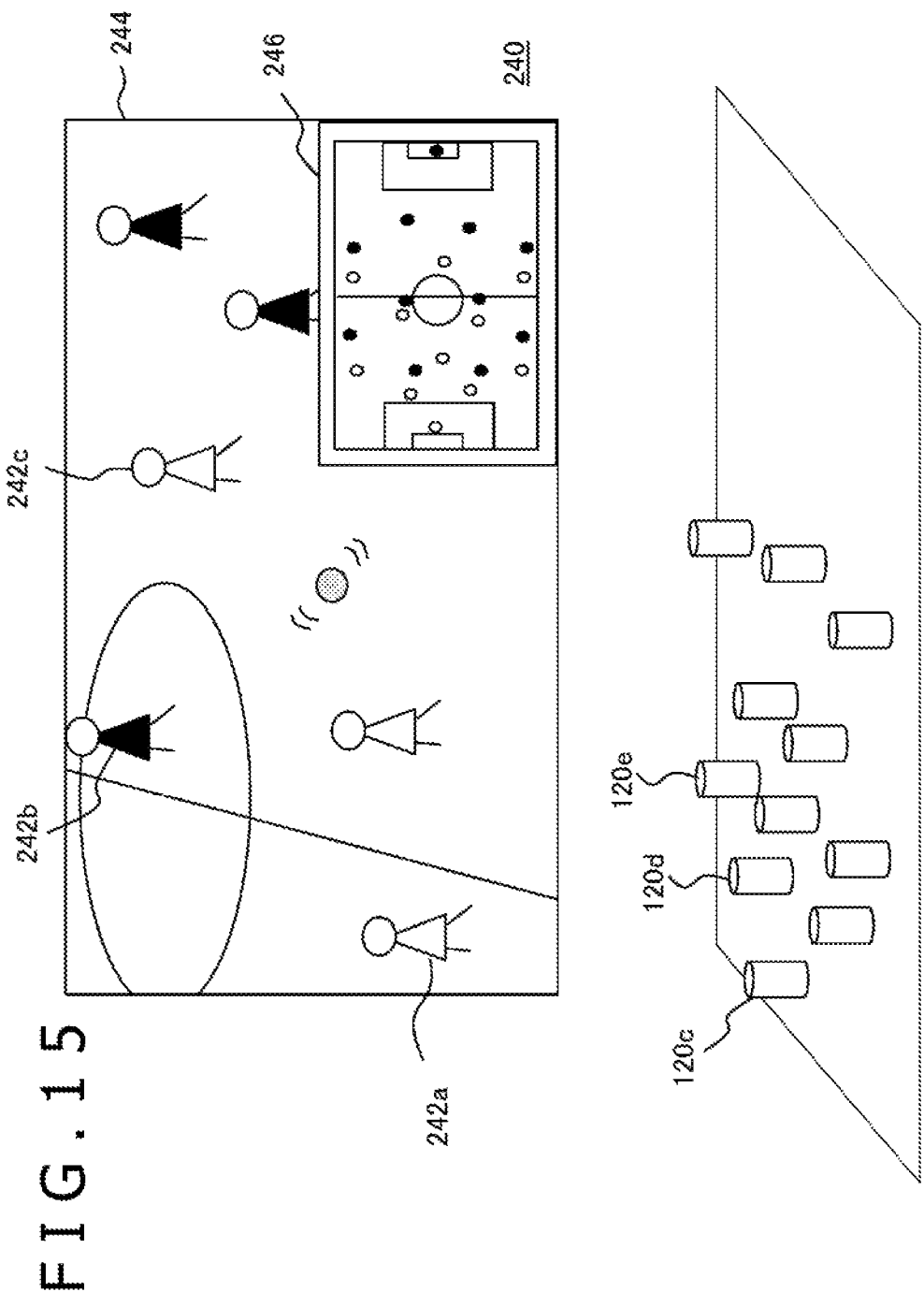
FIG. 15 is a diagram illustrating a relation between a display image and real bodies when a same object is expressed by dividing it by scene in the present embodiment.

Further, with a same object, a scene in which this object moves in accordance with the movement of the real body 120 is separated from a scene in which this object moves in accordance with the information processing executed by the input apparatus 14 and the information processing apparatus 10, thereby making it unnecessary to consider the consistency in the latter scene. Referring to FIG. 15, there is shown a diagram illustrating a relation between a display screen and real bodies if a same object is represented as separated by the scenes.

This example assumes a succor game, in which, in a main screen 244 displayed overall in a screen 240, player objects 242*a*, 242*b*, 242*c*, and so on are playing in a succor field. In this image, the user moved the players of the own team through the input apparatus 14 and the information processing apparatus 10 moved the players of the opponent team in accordance with a program, this image being generated by the input apparatus compatible processing block 232. On the other hand, in the lower right of the screen 240, a sub screen 246 representative of an initial formation is shown. The sub screen 246 is shown as a bird's eye view of the succor field in which the arrangement of each player at the beginning of a game, the white dots representing the players of the own team while the black dots representing the players of the opponent team.

The arrangement of the players of the own team in this sub screen 246 is a reflection of the positions of the real bodies 120*c*, 120*d*, 120*e*, and so on in the real world. Therefore, the image of the sub screen 246 is generated by the real body compatible processing block 230. In this case, the arrangement of the players of the opponent team is determined the real body compatible processing block 230 in accordance with a program. Alternatively, as described with reference to FIG. 10, the position of a real body arranged by another user located at a remote place may be acquired through the network 18 so as to reflect the acquired position onto the arrangement of the opponent team. While viewing the sub screen 246, the user moves the real bodies 120*c*, 120*d*, 120*e*, and so on so as to adjust the formation of the players of the own team and determines a positional relation and a movement flow such that the player corresponding to the real body 120*e* moves to the position of the player corresponding to the real body 120*d* in accordance with the movement of the player corresponding to the real body 120*d* toward the opponent lines, subsequently starting and playing the game in the main screen 244. It should be noted that the sub screen 246 may not be displayed at the same time with the main screen 244; the sub screen 246 may be displayed only at the time of switching between screens or being called by the user.

Here, the movements of the player objects 242a, 242b, 242c, and so on during the playing of a game in the main screen 244 are not reflected on the real bodies 120c, 120d, 102e, and so on. That is, as described above, even if a player is the same, the real bodies 120c, 120d, 120e, and so on are used for the setting of the initial formation, the movement during the game is represented only by a virtual world. Especially, in the case of a game such as a succor game that is important in the feeling of speed, it is often convenient for the user to operate only through the input apparatus 14 while attentively viewing the screen. On the other hand, in the case where the speed is not important but the movement is be made easy such as the case in which an initial formation is determined, an operation meaningful for the positional relation between two or more real bodies or the moving loci thereof is executed, or the arrangement is to be largely changed, the operation done by use of real bodies is valid. Therefore, operations can be executed always in proper states by switching the operation means for different scenes in accordance with the characteristics described above.

According to the present embodiment described above, real bodies and objects inside a screen are related with each other so as to realize a mode in which, when one side moves, the other side follows that movement. At this time, the consistency between both the sides can be obtained in a more natural form by monitoring, physically or in the setting, the occurrence of situations in which the same movement cannot be realized and executing an appropriate scenario selected from the scenarios prepared in advance. To be more specific, if a user operation has been done to move a character by specifying the goal for the virtual world, the information processing apparatus searches for the shortest route in the real world to determine a route, thereby minimizing the movement time of each real body. The information processing apparatus also performs presentation on the screen or the real world so as to make the movement time enjoyable, thereby mitigating the stress imposed on the user.

Alternatively, if the user moves a real body to a prohibited area where an opponent character that exists in the virtual world but does not in the real world or an obstacle exists, the information processing apparatus outputs an error message or moves real body concerned to another position. Still alternatively, the own character can set to a position corresponding to a real body by moving an opponent character or deforming an obstacle in the virtual world. In addition, an image is projected or displayed by use of a projector or a tablet PC so as to display suggestive graphics in a prohibited area in the real world.

If an object disappears or appears in the virtual world halfway through displaying, then the information processing apparatus moves the corresponding real body to the outside of the play field or moves a standby real body to a corresponding position in the play field. Alternatively, a prohibited area is generated by making the wreck of an object remain in the virtual world. These scenarios allow to link to the subsequent progression of a game without giving the feeling of unnaturalness to the user or causing system errors in both the situations where the user operates with an input apparatus and moves a real body.

Further, capturing operation information of an opponent user through a network and accordingly reflecting the captured operation information onto the movement of a real body or the movement of an image to be projected to the play field. This is enabled the user to enjoy a game full of presence in which real bodies can move or be moved in spite of a network game. This configuration is applicable not only to a game of deciding battles but also to a novel play and art in which two or more users jointly create works.

The present invention has been described on the basis of the preferred embodiment. It should be understood by those skilled in the art that the above embodiment is illustrative, that the combination of components and processes can be modified in various ways, and that such modification examples also fall within the scope of the present disclosure.

REFERENCE SIGNS LIST

1 . . . Information processing system, 10 . . . Information processing apparatus, 14 . . . Input apparatus, 16 . . . Display apparatus, 18 . . . Network, 19 . . . Play field, 20 . . . Communication block, 22 . . . Real body state specification block, 24 . . . Real body information storage block, 26 . . . Interlock scenario storage block, 30 . . . Information processing block, 32 . . . Display processing block, 50 . . . Real body information, 120 . . . Real body, 122 . . . Camera, 143 . . . State information acquisition block, 146 . . . Drive block, 148 . . . Communication block.

INDUSTRIAL APPLICABILITY

As described above, the present invention is applicable to information processing apparatuses such as a computer, a game apparatus, and a content display apparatus, and toys, and a system including these devices.

The invention claimed is:
1. An information processing apparatus comprising:
an information processing block configured to execute an information processing in accordance with at least one of a user operation for moving a real body existing in a real world and a user operation through a connected input apparatus; and
a display processing block configured to draw a virtual space in which a virtual object related with the real body exists as a result of the information processing to display the drawn virtual space onto a display apparatus,
wherein the information processing block maintains a state in which the real world including the real body corresponds to the virtual space including the virtual object by executing at least one of a real body control processing for generating a control signal for causing the real body in the real world to generate a corresponding movement when the virtual object is moved in the virtual space by the user operation through the input apparatus and transmitting the generated control signal to the real body concerned and an operation processing on a virtual space for causing the virtual object in the virtual space to generate a corresponding movement when the user operation for moving the real body is executed and, when a situation associated with a preset situation is detected, executes a corresponding processing selected according to the situation concerned, thereby continuing a subsequent information processing, and
wherein, when the virtual object disappears in the virtual space, the information processing block maintains a corresponding state by providing consistency with existence of the real body in the real world by leaving a wreck thereof at the same place.

2. The information processing apparatus according to claim 1, wherein
the information processing block generates a control signal for making the real body perform a predetermined movement as the corresponding processing and transmits the generated control signal to the real body concerned.

3. The information processing apparatus according to claim 1, wherein
the information processing block determines an area in the real world corresponding to an area in the virtual space in which the virtual object cannot exist as a prohibited area in which the real body cannot be placed and, as the preset situation, upon detection of that the real body has entered the prohibited area concerned or a predetermined area around the prohibited area, generates a control signal for moving the real body to another area, and transmits the generated control signal to the real body concerned.

4. The information processing apparatus according to claim 1, wherein
the information processing block determines an area in the real world corresponding to an area in the virtual space in which the virtual object cannot exist as a prohibited area in which the real body cannot be placed and, as the preset situation, upon detection of that the real body has entered the prohibited area concerned or a predetermined area around the prohibited area, generates a control signal for giving an alert to a user by at least one of vibration, image display, and audio output of the real body, and transmits the generated control signal to the real body concerned.

5. The information processing apparatus according to claim 1, wherein,
as the preset situation, when an operation for specifying a goal and instantly moving the virtual object in the virtual space is executed by the user operation through the input apparatus, the information processing block determines a goal in the real world corresponding to the goal concerned, searches for a shortest route to the determined goal, thereby generating a control signal for moving the real body along the shortest route concerned, and transmitting the generated control signal to the real body concerned.

6. The information processing apparatus according to claim 1, wherein
as the preset situation, when an operation for specifying a goal and instantly moving the virtual object in the virtual space is executed by the user operation through the input apparatus, the information processing block generates a control signal for moving the real body to a goal in the real world corresponding to the goal concerned along a route following predetermined rules and transmits the generated control signal to the real body concerned.

7. The information processing apparatus according to claim 1, wherein
the information processing block determines an area in the real world corresponding to an area in the virtual space in which the virtual object cannot exist as a prohibited area in which the real body cannot be placed and, as the preset situation, upon detection of that the real body has entered a predetermined area around the prohibited area concerned, generates a control signal for moving a standby real body indicative of the prohibited area to the prohibited area concerned, and transmits the generated control signal to the standby real body concerned.

8. The information processing apparatus according to claim 1, wherein,
as the preset situation, when the virtual object disappears in the virtual space, the information processing block generates a control signal for moving the real body corresponding to the virtual object out of a predetermined area in the real world and, when the virtual object appears in the virtual space, generates a control signal for moving a standby real body to be made correspond to the virtual object concerned to a corresponding position in the real world, and transmits the generated control signal to each subject real body.

9. The information processing apparatus according to claim 1, wherein
the information processing block further determines an area in the real world corresponding to an area in the virtual space in which the virtual object cannot exist as a prohibited area in which the real body cannot be placed, and
the display processing block further generates an image representative of the prohibited area in the real world and projects the generated image onto a plane on which the real body is placed through a projector or displays the generated image on a screen of a tablet computer making up the plane.

10. The information processing apparatus according to claim 1, wherein
the information processing block determines an area in the real world corresponding to an area in the virtual space in which the virtual object cannot exist as a prohibited area in which the real body cannot be placed, as the preset situation, upon detection of that the real body has entered the prohibited area concerned or a predetermined area around the prohibited area, changes an area corresponding to the prohibited area to an area in which the virtual object can exist by operating the virtual space.

11. An information processing system comprising:
an information processing apparatus; and
a real body that can be moved at least one of manners; by a user and by a control signal from the information processing apparatus;
the information processing apparatus including
an information processing block configured to execute an information processing in accordance with at least one of a user operation for moving the real body and a user operation through a connected input apparatus, and
a display processing block configured to draw a virtual space in which a virtual object related with the real body exists as a result of the information processing to display the drawn virtual space onto a display apparatus;
the information processing block maintaining a state in which a real world including the real body corresponds to the virtual space including the virtual object by executing at least one of a real body control processing for generating a control signal for causing the real body in the real world to generate a corresponding movement when the virtual object is moved in the virtual space by the user operation through the input apparatus and an operation processing on a virtual space for causing the virtual object in the virtual space to generate a corresponding movement when the user operation for moving the real body is executed, and, when a situation associated with a preset situation is detected, executing a corresponding processing selected according to the situation concerned, thereby continuing a subsequent information processing, wherein, as the preset situation, when the virtual object disappears in the virtual space, the information processing block generates a control signal for moving the real body corresponding to the virtual object out of a predetermined area in the real world and, when the virtual object appears in the virtual space, generates a control signal for moving a standby real body to be made correspond to the virtual object concerned to a corresponding position in the real world, and transmits the generated control signal to each subject real body.

12. An information processing method by an information processing apparatus, the method comprising:

executing an information processing in accordance with at least one of a user operation for moving a real body existing in a real world and a user operation through a connected input apparatus; and drawing a virtual space in which a virtual object related with the real body exists as a result of the information processing to display the drawn virtual space onto a display apparatus;

the information processing including maintaining a state in which the real world including the real body corresponds to the virtual space including the virtual object by executing at least one of a real body control processing for generating a control signal for causing the real body in the real world to generate a corresponding movement when the virtual object is moved in the virtual space by the user operation through the input apparatus and transmitting the generated control signal to the real body concerned and an operation processing on a virtual space for causing the virtual object in the virtual space to generate a corresponding movement when the user operation for moving the real body is executed, and continuing a subsequent information processing by executing, when a situation associated with a preset situation is detected, a corresponding processing selected according to the situation concerned, wherein, when the virtual object disappears in the virtual space, maintaining a corresponding state by providing consistency with existence of the real body in the real world by leaving a wreck thereof at the same place.

13. A non-transitory computer readable medium having stored thereon a computer program for a computer, the computer program comprising:

by an information processing block, executing an information processing in accordance with at least one of a user operation for moving a real body existing in a real world and a user operation through a connected input apparatus; and by a display processing block, drawing a virtual space in which a virtual object related with the real body exists as a result of the information processing to display the drawn virtual space onto a display apparatus;

the information processing including maintaining a state in which the real world including the real body corresponds to the virtual space including the virtual object by executing at least one of a real body control processing for generating a control signal for causing the real body in the real world to generate a corresponding movement when the virtual object is moved in the virtual space by the user operation through the input apparatus and transmitting the generated control signal to the real body concerned and an operation processing on a virtual space for causing the virtual object in the virtual space to generate the corresponding movement when the user operation for moving the real body is executed, and continuing a subsequent information processing by executing, when a situation associated with a preset situation is detected, a corresponding processing selected according to the situation concerned, wherein, as the preset situation, when the virtual object disappears in the virtual space, the information processing block generates a control signal for moving the real body corresponding to the virtual object out of a predetermined area in the real world and when the virtual object appears in the virtual space, generates a control signal for moving a standby real body to be made correspond to the virtual object concerned to a corresponding position in the real world, and transmits the generated controls signal to each subject real body.

* * * * *